US011479356B2

(12) United States Patent
Winderl et al.

(10) Patent No.: US 11,479,356 B2
(45) Date of Patent: Oct. 25, 2022

(54) DRIVER DEVICE FOR AN AIRCRAFT

(71) Applicant: Cyclotech GmbH, Linz (AT)

(72) Inventors: Michael Winderl, Neunberg vorn Wald (DE); Stephan Lanser, Alberndorf (AT)

(73) Assignee: Cyclotech GmbH, Linz (AT)

( * ) Notice: Subject to any disclaimer, the term of this patent is extended or adjusted under 35 U.S.C. 154(b) by 214 days.

(21) Appl. No.: 16/771,868

(22) PCT Filed: Dec. 11, 2018

(86) PCT No.: PCT/EP2018/084371
§ 371 (c)(1),
(2) Date: Jun. 11, 2020

(87) PCT Pub. No.: WO2019/115532
PCT Pub. Date: Jun. 20, 2019

(65) Prior Publication Data
US 2021/0229803 A1 Jul. 29, 2021

(30) Foreign Application Priority Data

Dec. 14, 2017 (DE) ..................... 10 2017 011 890.6

(51) Int. Cl.
*B64C 39/00* (2006.01)
*B64C 39/10* (2006.01)
*B64C 11/00* (2006.01)

(52) U.S. Cl.
CPC ............ *B64C 39/005* (2013.01); *B64C 39/10* (2013.01); *B64C 11/006* (2013.01);
(Continued)

(58) Field of Classification Search
CPC .... B64C 39/003; B64C 39/005; B64C 11/006
See application file for complete search history.

(56) References Cited

U.S. PATENT DOCUMENTS 1,753,252 A * 4/1930 Strandgren ........... B64C 11/006
416/108
2,413,460 A * 12/1946 Main ..................... B64C 39/005
416/116

(Continued)

FOREIGN PATENT DOCUMENTS

DE 19637833 2/1998

*Primary Examiner* — Brian M O'Hara
*Assistant Examiner* — Michael B. Kreiner
(74) *Attorney, Agent, or Firm* — Peter A. Nieves; Sheehan Phinney; Bass & Green PA

(57) ABSTRACT

The invention relates to a propulsion device for an aircraft, comprising a blade (2) which can be rotated about an axis of rotation (51) of the propulsion device along a circular path (52) and is mounted for pivoting about a blade bearing axis parallel to the axis of rotation; a pitch mechanism having a coupling device (31) and a bearing device (33); and an offset device (4) to which the blade is coupled, the offset device defining an eccentric bearing axis (41) which is mounted at an adjustable offset distance. The coupling device is coupled to the blade at a coupling point (32) which is positioned in such a way that the plane that comprises the blade bearing axis and the coupling point and the tangential plane to the circular path through the blade bearing axis include a certain, non-vanishing angle ($w_\alpha$) when the offset distance is set to zero. According to a second aspect the blade bearing axis is shifted toward the axis of rotation by a certain distance relative to the plane that extends through the center of mass of the blade and that extends parallel to the axis of rotation and to the chord of the blade.

18 Claims, 12 Drawing Sheets

Figure 1:
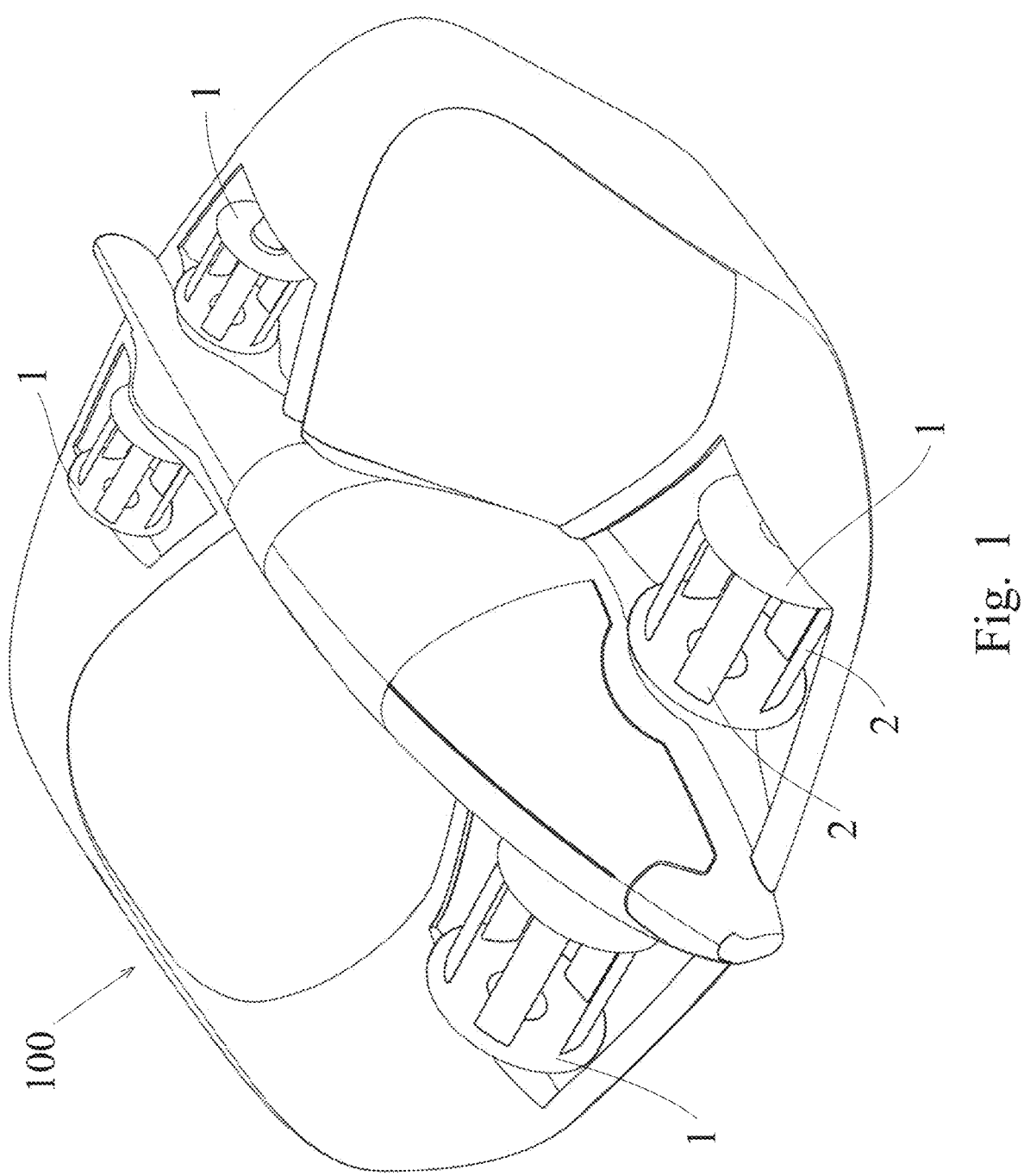

(52) U.S. Cl.
CPC .. *B64C 2039/105* (2013.01); *B64C 2201/028* (2013.01); *B64C 2201/108* (2013.01)

(56) References Cited

U.S. PATENT DOCUMENTS

| | | | | |
|---|---|---|---|---|
| 4,194,707 | A * | 3/1980 | Sharpe | B64C 29/0016 |
| | | | | 416/111 |
| 4,196,707 | A | 3/1980 | Sharpe | |
| 5,265,827 | A * | 11/1993 | Gerhardt | B64C 39/005 |
| | | | | 244/70 |
| 9,346,535 | B1 * | 5/2016 | Adams | B64C 39/005 |
| 10,279,900 | B2 * | 5/2019 | Robertson | B64C 27/06 |
| 10,384,776 | B2 * | 8/2019 | Choi | B64D 27/26 |
| 10,814,967 | B2 * | 10/2020 | Groninga | B64C 25/52 |
| 2007/0200029 | A1 | 8/2007 | Sullivan | |
| 2010/0322769 | A1 | 12/2010 | Stephens | |

\* cited by examiner

| n\k | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 3 | 1 |   | 2<br>4 |   |   | 5<br>7 |   |   | 8<br>10 |   |   | 11<br>13 |   |   | 14<br>16 |   |
| 4 | 1 |   |   | 3<br>5 |   |   | 7<br>9 |   |   |   | 11<br>13 |   |   |   |   |   |
| 5 | 1 |   |   |   | 4<br>6 |   |   |   |   | 9<br>11 |   |   |   |   | 14<br>16 |   |
| 6 | 1 |   |   |   |   | 5<br>7 |   |   |   |   |   | 11<br>13 |   |   |   |   |

Fig. 10

DRIVER DEVICE FOR AN AIRCRAFT

CROSS-REFERENCE TO RELATED APPLICATIONS

This application is a national stage entry of PCT/EP18/84371, filed Dec. 11, 2018 and entitled Driver Device for an Aircraft, which claims priority to German application number 102017011890.6, filed Dec. 14, 2017 and entitled Driver Device for an Aircraft. Each of these applications is incorporated by reference in its entirety.

The subject matter of the invention is a propulsion device for an aircraft. Specifically, the invention relates to a cyclogyro rotor with reduced loads on the structural elements of the rotor.

A cyclogyro rotor is based on the principle of thrust generation with rotating blades. In contrast to classical rotating blades, such as those which are used in the propulsion device of a helicopter, the axis of rotation of the blades of a cyclogyro rotor is oriented parallel to the longitudinal axis of the blades. The direction of thrust of the entire cyclogyro rotor is normal to the axis of rotation.

Cyclogyros are aircrafts using cyclogyro rotors as a propulsion device. Cyclogyros are moreover, like helicopters, so-called vertical take-off aircrafts (also called VTOL vehicles, for "Vertical Take-Off and Landing"), i.e. aircrafts which are capable of starting and landing vertically without requiring a runway.

In stationary operation all blades of the cyclogyro rotor ideally are to be oriented best possible to the direction of flow at any time so as to make a maximum contribution to the entire thrust with minimally required driving power. The maximum pitch angle of the blades relative to the direction of flow has a direct influence on the amount of the thrust generated. Due to the rotation of the rotor the pitch angle of each blade has to be changed continuously during a revolution. Each blade of a cyclogyro rotor thus performs a periodic change of the pitch angle. This periodic change of the pitch angle is called pitch movement.

Various pitch mechanisms are known for pitch movement generation. For instance, each blade may be connected with an eccentric bearing axis via one or a plurality of conrods. The resulting pitch movement of a blade is repeated cyclically with every rotor revolution then. Consequently, the progression of the pitch angle may be developed into a Fourier series as a function of the current rotor twist. In this representation the fundamental harmonic value is typically dominating. It is superimposed by a mean value, and by higher harmonic values. The latter constitute undesired vibrations which stress the individual structural elements of a cyclogyro rotor. Since their amplitude and phasing cannot be chosen directly, they cannot be used for optimizing the aerodynamic efficiency, either.

Due to the quick rotation speed of the cyclogyro rotor in operation, its components are inter alia subject to loads in the form of forces of inertia and moments of inertia. This applies in particular for the blades since they are, as a matter of principle, very far from the axis of rotation, perform complex movements and form a relatively high share of the total mass of the cyclogyro rotor.

In the typical implementation of a cyclogyro rotor a part of the centrifugal force acting on the blade is introduced at one side of the conrod. The pitch movement forced by the conrod produces, owing to the mass inertia of the blade, additional forces in the first-mentioned. The second side of the conrod is connected with an eccentrically mounted offset disk (or directly with an offset pin).

Irrespective of the number of blades this results in load on the eccentric bearing axis in the form of a force acting radially outward. The time average of this force increases in good approximation linearly with the maximum pitch angle of the blade and by the square with the rotational speed.

This load constitutes a great challenge when designing a cyclogyro rotor. With respect to the installation space available and the lightweight construction requirements typical in aviation, it is not possible to design the eccentric bearing axis arbitrarily stable.

Typically, the position of the eccentric bearing axis is designed to be adjustable for changing the thrust. A necessary adjustment unit may be overloaded by the forces occurring. The consequence of this is that the eccentric bearing point moves further away from the axis of rotation, which results in a higher maximum pitch angle and consequently a higher load on the eccentric bearing axis. The result of this is an instable behavior which leads regularly to the destruction of the cyclogyro rotor. Additionally, the load on the eccentric bearing axis increases the energy consumption in the adjustment unit and restricts the dynamics thereof.

It is therefore an object of the present invention to reduce the afore-mentioned loads on the eccentric bearing axis of a cyclogyro rotor at high speed.

In accordance with a first aspect of the invention a propulsion device for an aircraft is provided which comprises the following components: a blade which can be rotated about an axis of rotation of the propulsion device along a circular path; a pitch mechanism having a coupling device and a bearing device. The blade is, by the bearing device, mounted for pivoting about a blade bearing axis parallel to the axis of rotation of the propulsion device. The propulsion device in accordance with the invention further comprises an offset device to which the blade is coupled by the coupling device at a connection point. The offset device defines an eccentric bearing axis which is mounted at an adjustable offset distance parallel to the axis of rotation of the propulsion device in such a way that the rotation of the blade about the axis of rotation of the propulsion device along the circular path effects a pitch movement of the blade when the offset distance is set to a nonzero value. The coupling device is coupled to the blade at a coupling point, wherein the coupling point is positioned in such a way that the plane that comprises the blade bearing axis and the coupling point and the tangential plane to the circular path through the blade bearing axis include a certain, non-vanishing angle when the offset distance is set to zero.

Due to the fact that the eccentric bearing axis which is defined by the offset device is mounted eccentrically at an offset distance parallel to the axis of rotation of the propulsion device, a pendular movement of the blade about the blade bearing axis of the blade results when the blade is coupled by the coupling device. This pendular movement is called pitch movement.

In accordance with the invention the pitch movement is described by the angle included by the tangent and/or tangential plane to the circular path through the blade bearing axis and the chord of the blade. It is of advantage if the pitch movement takes place in an angular range of −50° to +50° about the tangent to the circular path. When this angular range is used, relevant thrust forces can be generated. In the case of a symmetrical pitch movement with respect to the tangent to the circular path the blade is positioned in such a way relative to the blade bearing point and the coupling point that the chord and the tangent to the circular path are parallel when the offset distance is zero. If the chord is, with an offset distance zero, already positioned in a twisted manner relative to the tangent to the circular path, the result is a non-vanishing, but constant pitch angle with an offset distance zero, and consequently an asymmetrical pitch movement with respect to the tangent to the circular path with a non-vanishing offset distance. It may therefore be advantageous that the pitch movement takes place asymmetrically about the tangent to the circular path, i.e. in this case the maximum angle of the pitch movement above the tangent is larger than the maximum angle below the tangent, or vice versa.

Due to the fact that the certain, non-vanishing angle is set with an offset distance of zero, the definition of the certain, non-vanishing angle is unambiguous. In the case of a non-vanishing offset distance this angle would always change as a function of the pitch angle.

The chord means the connecting line between the leading edge and the trailing edge of a blade.

The leading edge and the trailing edge are given by the intersections of the camber line with the profile contour. The camber line (also referred to as skeleton line, curvature line or bending line) is a line consisting of the centers between the upper side and the lower side of the blade profile perpendicular to the chord. The camber line is in relation to the asymmetry between the upper side and the lower side of the blade profile. In the case of symmetrical profiles the camber line corresponds to the chord. Preferably, symmetrical profiles are used. The invention is not restricted to symmetrical profiles, though.

Due to the fact that the coupling point is positioned such that the plane that comprises the blade bearing axis and the coupling point and the tangential plane to the circular path through the blade bearing axis include a certain, non-vanishing angle when the offset distance is set to zero, higher harmonic values of the pitch movement of the blade can be influenced and reduced.

It is emphasized in this place that the effect in accordance with the invention occurs completely independently of the specific geometry and design of the blade and/or blade profile. In accordance with the invention, only the angle is important which is included by the tangential plane to the circular path through the blade bearing axis and the plane that comprises the blade bearing axis and the coupling point and/or which is included by the tangent to the circular path at the blade bearing point and the connection straight line through the blade bearing point and the coupling point.

A pitch movement occurs when the offset distance is set to a nonzero value. In accordance with the invention the coupling point is thus determined in a configuration in which the eccentric bearing axis which is defined by the offset device and the axis of rotation of the propulsion device are matching. For the operation of the propulsion device it is expedient to set the offset distance to a non-vanishing value to thus cause the pitch movement. When the non-vanishing offset distance exists, thrust is generated in a certain direction.

The pitch movement of the blade is repeated cyclically with every rotor revolution. The progression of the pitch angle may therefore be developed into a Fourier series as a function of the current rotor twist. In this representation the fundamental harmonic value is typically dominating. It is superimposed by a mean value, and by the afore-mentioned higher harmonic values.

The coupling point of the coupling device to the blade performs two rotational movements in the operation of the propulsion device. The first rotational movement occurs due to the rotation of the blade about the axis of rotation of the propulsion device. The second rotational movement is caused by the pitch mechanism which pivots the blade about the blade bearing axis. Due to the geometric construction of the pitch mechanism there result higher harmonic values in the second rotational movement, the pitch movement, and in continuation due to the superimposing with the first rotational movement higher harmonic values in the loads of the blade.

These higher harmonic values constitute unintended vibrations in the loads which may be transferred via the coupling device to the offset device and/or the eccentric bearing axis thereof. This impairs the stability of the offset device and of the eccentric bearing axis thereof.

Preferably, the coupling point is positioned at the side of the tangential plane to the circular path which faces the axis of rotation of the propulsion device.

It is of advantage if the coupling point is positioned to be shifted from the tangential plane of the circular path in the direction of the axis of rotation of the propulsion device in such a way that the certain, non-vanishing angle lies in a range of between 5° and 15°, preferably in a range of between 8° and 12°, particularly preferred in a range of between 9.5° and 10.5°.

Furthermore, it is of particular advantage if the certain, non-vanishing angle is set such that the plane that comprises the blade bearing axis and the coupling point and the plane that comprises the axis of rotation of the propulsion device and the connection line from the coupling point to the axis of rotation include an angle of almost 90° when the offset distance is set to zero. In this case all the even higher harmonic values of the pitch movement almost cancel out during the rotation of the propulsion device about its axis of rotation. Thus, the loads on the offset device are also minimized by the even higher harmonic values of the pitch movement.

It is expedient to determine the certain, non-vanishing angle as a function of the ratio of the two following dimensions: First: the distance of the blade bearing axis to the coupling point; second: the distance of the axis of rotation of the propulsion device to the blade bearing axis; each provided that the offset distance is set to zero. Preferably, the certain, non-vanishing angle indicated in radian assumes a value in the range of 75% to 125% of the afore-mentioned ratio of the first dimension to the second dimension; in a particularly preferred manner the certain, non-vanishing angle assumes a value in the range of 90% to 110% of the ratio mentioned.

Furthermore, it is of particular advantage if the certain non-vanishing angle is set such that the plane that comprises the blade bearing axis and the coupling point and the plane that comprises the axis of rotation of the propulsion device and the connection line from the coupling point to the axis of rotation include an angle of almost 90° when the offset distance is set to zero. In this case all the even higher harmonic values of the pitch movement almost cancel out during the rotation of the propulsion device about its axis of rotation. Thus, the loads on the offset device are also minimized by the even higher harmonic values of the pitch movement.

Preferably, the coupling point of the coupling device to the blade is positioned outside of the blade profile. This has the advantage that the blade as such is not impaired by the coupling of the coupling device. Advantageously the stability of the blade is thus not impaired adversely.

Preferably, blades are used with a profile which is symmetrical with respect to the chord. The invention is, however, not restricted to such symmetrical profiles.

It is of advantage if the blade bearing axis is shifted toward the axis of rotation of the propulsion device by a certain distance relative to the plane that extends through the center of mass of the blade and that extends parallel to both the axis of rotation and the chord of the blade.

The shifting of the blade bearing axis toward the axis of rotation by a certain distance relative to the plane that extends through the center of mass of the blade and that extends parallel to both the axis of rotation and the chord of the blade has the advantage that the mean force at the offset device and/or at the eccentric bearing axis which is defined by the offset device is minimized. The mean force at the offset device is the average of the entire force acting on the offset device in the course of a complete rotor revolution. If the force acting on the offset device and/or the eccentric bearing axis is developed into a Fourier series, the mean force is the term of zeroth order. Thus, the load on the offset device and/or on the eccentric bearing axis is further reduced. Loads are also exerted on the offset device and/or eccentric bearing axis due to torques engaging on the blade. As already explained before, the blade performs two rotational movements coupled with one another during the operation of the propulsion device. The first rotational movement originates from the rotation of the blade about the axis of rotation of the propulsion device along the circular path. The second rotational movement corresponds to the pitch movement of the blade about the blade bearing axis. In relation to the blade bearing axis two contributions result to the torque acting on the blade. The first contribution is related with the rotational movement of the blade about the axis of rotation of the propulsion device along the circular path. This rotational movement effects a centrifugal force on the blade. A corresponding torque is therefore always produced when the blade is mounted at a distance from its center of gravity. The second amount is related with the pitch movement of the blade about its blade bearing axis. The corresponding torque depends on the mass moment of inertia of the blade, on the one hand, and on the (angular) acceleration of the blade experienced during the pitch movement, on the other hand.

Both contributions to the torque mentioned are dependent on the distance of the blade bearing point and/or the blade bearing axis from the center of mass. The resulting torque may therefore be minimized by varying this distance.

The resulting torque produces diverse forces, such as tensile and/or compressive forces, in the coupling device. These forces are transferred to the offset device via the coupling device. By the positioning of the blade bearing point and/or the blade bearing axis in accordance with the invention it is thus possible to minimize the mean force at the offset device and/or the eccentric bearing axis.

Preferably, the blade has a mass distribution which is so inhomogeneous that it causes the shifting by the certain distance. A simple implementation of this inhomogeneous mass distribution consists in increasing the mass density on the blade upper side facing away from the axis of rotation, e.g. by applying additional weights or an appropriate coating on the blade upper side. Thus, the center of mass of the blade is displaced further outward in the radial direction relative to the axis of rotation of the rotor. With an otherwise unchanged blade geometry the effect according to the invention can thus be produced.

It is of advantage if the blade bearing axis is positioned in a region which is confined by the plane being perpendicular to the chord and extending through the center of mass, on the one hand, and by the plane being perpendicular to the chord and extending through the leading edge, on the other hand. This makes it possible to obtain exclusively tensile forces in the coupling device, which in turn enables a highly simplified construction thereof.

Preferably, the blade bearing axis extends outside the blade profile. This has the advantage that the stability of the blade is not impaired by the bearing device.

It is of advantage if the propulsion device in accordance with the invention further comprises a disk which designed such that it separates the blade(s) aerodynamically from the remaining components of the propulsion device. Such disk is especially advantageous for the case that the propulsion device is operated at higher speeds.

Preferably, the propulsion device further comprises a connection element, wherein the connection element, at the point at which the blade is mounted for pivoting by the bearing device, is connected rigidly with the blade, and at the coupling point of the blade is connected movably with the coupling device. The connection element comprises in a particularly preferred manner a lever arm. This enables the rigid connection of the lever arm with the blade. The connection element is preferably an independent structural element for coupling the coupling device to the blade. In a particularly preferred manner the lever arm is connected with the blade from the outside. The pitch movement is thus introduced into the blade via the bearing device. The advantage is that the coupling point of the coupling device may be chosen outside the blade profile. On the blade itself a place for mounting and for introduction of the pitch movement is sufficient. In a particularly preferred manner the blade bearing point is positioned at the place of the blade having the largest profile thickness. This has the advantage that the forces occurring can be distributed better in the blade. The result of this is also an improved construction and a weight reduction of the blade and/or of the pitch mechanism and/or of the propulsion device.

Specifically in the case of a propulsion device comprising a disk which is designed such that it separates the blade(s) aerodynamically from the remaining elements of the propulsion device, a connection element has the further advantage that no recess for the coupling device at the coupling point has to be provided in the disk. This is because in this case the coupling point can be chosen such that it does not get into contact with the disk.

It is advantageous if the offset device comprises an offset disk through the center of which the eccentric bearing axis extends, and which is mounted for rotating about the eccentric bearing axis, and wherein the connection point on the offset disk is arranged outside of the center thereof. In the case of a plurality of blades the offset disk comprises a corresponding connection point for each blade. The connection points are distributed evenly over the circumference of the offset disk. Instead of an offset disk it is also possible to use a so-called offset pin. In the case of a plurality of blades each blade is coupled to the same offset pin. The coupling devices of the individual blades are therefore coupled to the offset pin on top of each other. Thus, if an offset pin is used, the axial extension of the propulsion device increases as compared to the use of an offset disk.

In accordance with a second aspect of the invention a propulsion device for an aircraft is provided, comprising a blade which can be rotated about an axis of rotation of the propulsion device along a circular path; a pitch mechanism having a coupling device and a bearing device, wherein the blade is mounted by the bearing device for pivoting about a blade bearing axis parallel to the axis of rotation of the propulsion device; and an offset device to which the blade is coupled by the coupling device at a connection point. The offset device defines an eccentric bearing axis which is mounted at an adjustable offset distance parallel to the axis of rotation of the propulsion device, such that the coupling device couples the blade to the offset device in such a way that the rotation of the blade about the axis of rotation of the propulsion device along the circular path effects a pitch movement of the blade when the offset distance is set to a nonzero value. The blade bearing axis is shifted toward the axis of rotation of the propulsion device by a certain distance relative to the plane that extends through the center of mass of the blade and that extends parallel to both the axis of rotation and the chord of the blade.

The shifting of the blade bearing axis toward the axis of rotation of the propulsion device by a certain distance relative to the plane that extends through the center of mass of the blade and that extends parallel to both the axis of rotation and the chord of the blade has the advantage that the mean force at the offset device and the eccentric bearing axis is minimized Thus, the load of the offset device and of the eccentric bearing axis is further reduced. A detailed description of the loads exerted on the offset device due to forces engaging on the blade (the centrifugal force, on the one hand, inertia forces, on the other hand) has already been given further above in connection with an advantageous embodiment of the first aspect of the invention, which is referred to with respect to the second aspect of the invention. The two contributions mentioned are dependent on the distance of the blade bearing point and/or the blade bearing axis of the blade from the center of mass. By varying this distance it is thus possible to minimize the resulting force. This force is transferred to the offset device via the coupling device. Due to the positioning of the blade bearing point and/or the blade bearing axis at a particular distance from the center of mass it is thus possible to minimize the mean force at the offset device and/or the eccentric bearing axis.

Preferably, the blade has a mass distribution which is so inhomogeneous that it causes the shifting by the certain distance. A simple implementation of this inhomogeneous mass distribution consists in increasing the mass density on the blade upper side facing away from the axis of rotation, e.g. by applying additional weights or an appropriate coating on the blade upper side. Thus, the center of mass of the blade is displaced further outward in the radial direction relative to the axis of rotation of the propulsion device. This is equivalent to the blade bearing axis relative to the center of mass being closer in the radial direction to the axis of rotation of the propulsion device than the center of mass. With an otherwise unchanged blade geometry the effect according to the invention can thus be produced.

It is of advantage if the blade bearing axis is positioned in a region which is confined by the plane being perpendicular to the chord and extending through the center of mass, on the one hand, and by the plane being perpendicular to the chord and extending through the leading edge, on the other hand. This makes it possible to obtain exclusively tensile forces in the coupling device, which in turn enables a highly simplified construction thereof.

Preferably, the blade bearing axis extends outside the blade profile. Thus, the stability of the blade is not impaired by the bearing device.

Preferably, the coupling device comprises a conrod which connects the offset device with the coupling point of the blade. A conrod constitutes an implementation of the coupling device in accordance with the invention which is particularly suited in constructional respect. Preferably, an end piece of the conrod is coupled rotatably to the offset device.

It is of particular advantage to combine in one propulsion device advantageous embodiments of the first aspect of the invention with advantageous embodiments of the second aspect of the invention.

Preferably, the propulsion device in accordance with the invention comprises further blades, in a particularly preferred manner two, three, four, five, or six blades, with a respectively associated pitch mechanism, wherein all blades and pitch mechanisms of the propulsion device are of similar type, and wherein the blades of the propulsion device are evenly distributed about the axis of rotation of the propulsion device along the circular path. The propulsion device for an aircraft in accordance with the first or second aspect of the invention thus comprises preferably a plurality of blades which are distributed evenly about an axis of rotation of the propulsion device along a circular path, each of them being rotatable about the axis of rotation of the propulsion device along the circular path. Moreover, the preferred propulsion device comprises a plurality of pitch mechanisms with a respective coupling device and bearing device. Each blade is mounted by the corresponding bearing device for pivoting about a corresponding blade bearing axis parallel to the axis of rotation of the propulsion device. Furthermore, the preferred propulsion device comprises an offset device to which each blade is coupled by the corresponding coupling device at a corresponding connection point. The offset device defines an eccentric bearing axis mounted at an adjustable offset distance parallel to the axis of rotation of the propulsion device, so that the coupling devices couple the associated blades to the offset device in such a way that the rotation of the blades about the axis of rotation of the propulsion device along the circular path effects a pitch movement of the blades when the offset distance is set to a nonzero value. In accordance with the invention either each coupling device is coupled to the corresponding blade at a respective coupling point, wherein each of the coupling points is positioned such that the plane that comprises the corresponding blade bearing axis and the corresponding coupling point and the corresponding tangential plane to the circular path through the associated blade bearing axis include a certain, non-vanishing angle when the offset distance is set to zero. And/or the blade bearing axis of each blade is shifted toward the axis of rotation of the propulsion device by a certain distance relative to the plane that extends through the respective center of mass of the blade and that extends parallel to both the axis of rotation of the propulsion device and the chord of the respective blade.

In the case of a plurality of blades an even distribution about the axis of rotation of the propulsion device along the circular path means in connection with the invention that the blade bearing points and/or blade bearing axes of the blades are positioned approximately on the circular path and the blade bearing points and/or blade bearing axes of two adjacent blades each have almost the same distance from each other.

The use of a plurality of blades has the advantage that a higher thrust force of the propulsion device can be generated. Moreover, the even distribution of the blades along the circular path enables an at least partial cancelling of the forces acting on the offset device and/or the eccentric bearing axis. The advantageous embodiments of the first and/or second aspects of the invention may be applied correspondingly to the propulsion device with a plurality of blades. The resulting advantages correspond to those described in connection with the first and/or second aspects of the invention.

It is a particular advantage if the propulsion device comprises a total of five blades. Calculations have shown that propulsion devices in accordance with the invention which have a different number of blades react differently to harmonic values in the forces transferred by the corresponding coupling devices to the offset device and/or the eccentric bearing axis. Higher harmonic values occur, which load the offset device in the end. In the case of a total of five blades the higher harmonic values are strongly suppressed. This suppression is specifically intensified in a particular manner by the positioning of the coupling point of the coupling device at the blade in accordance with the invention, and/or by the positioning of the blade bearing axis in accordance with the invention.

Preferably the propulsion device is a cyclogyro rotor. The invention is not restricted to the use in cyclogyros, though. It is also possible to use the propulsion device in accordance with the invention e.g. in so-called Micro Air Vehicles (MAVs), i.e. unmanned drones of small size, or in manned aerial vehicles. Moreover, it is also possible to use the propulsion devices in accordance with the invention in connection with fluids other than air, such as, for instance, liquids.

Figure 2:
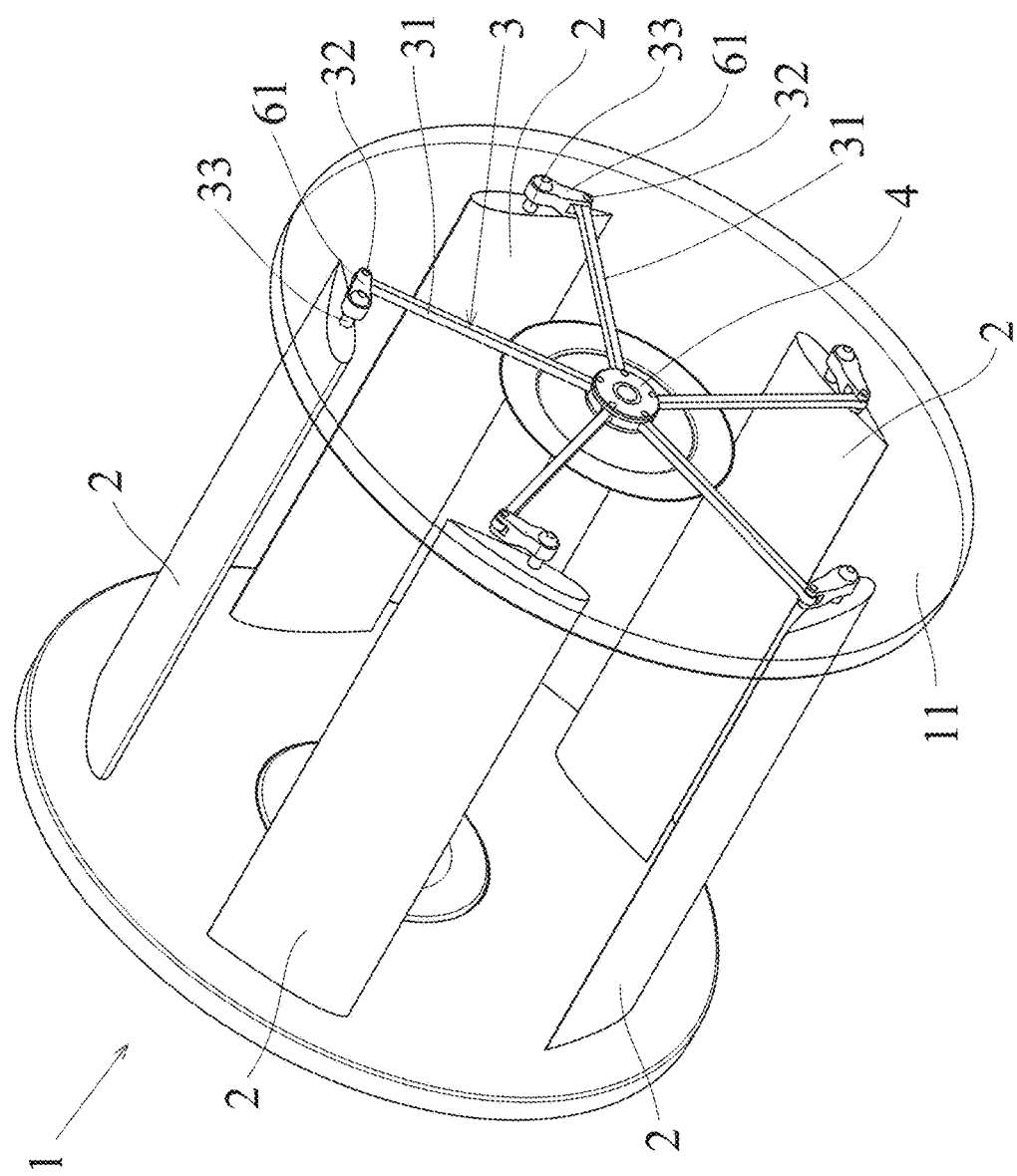
Figure 3:
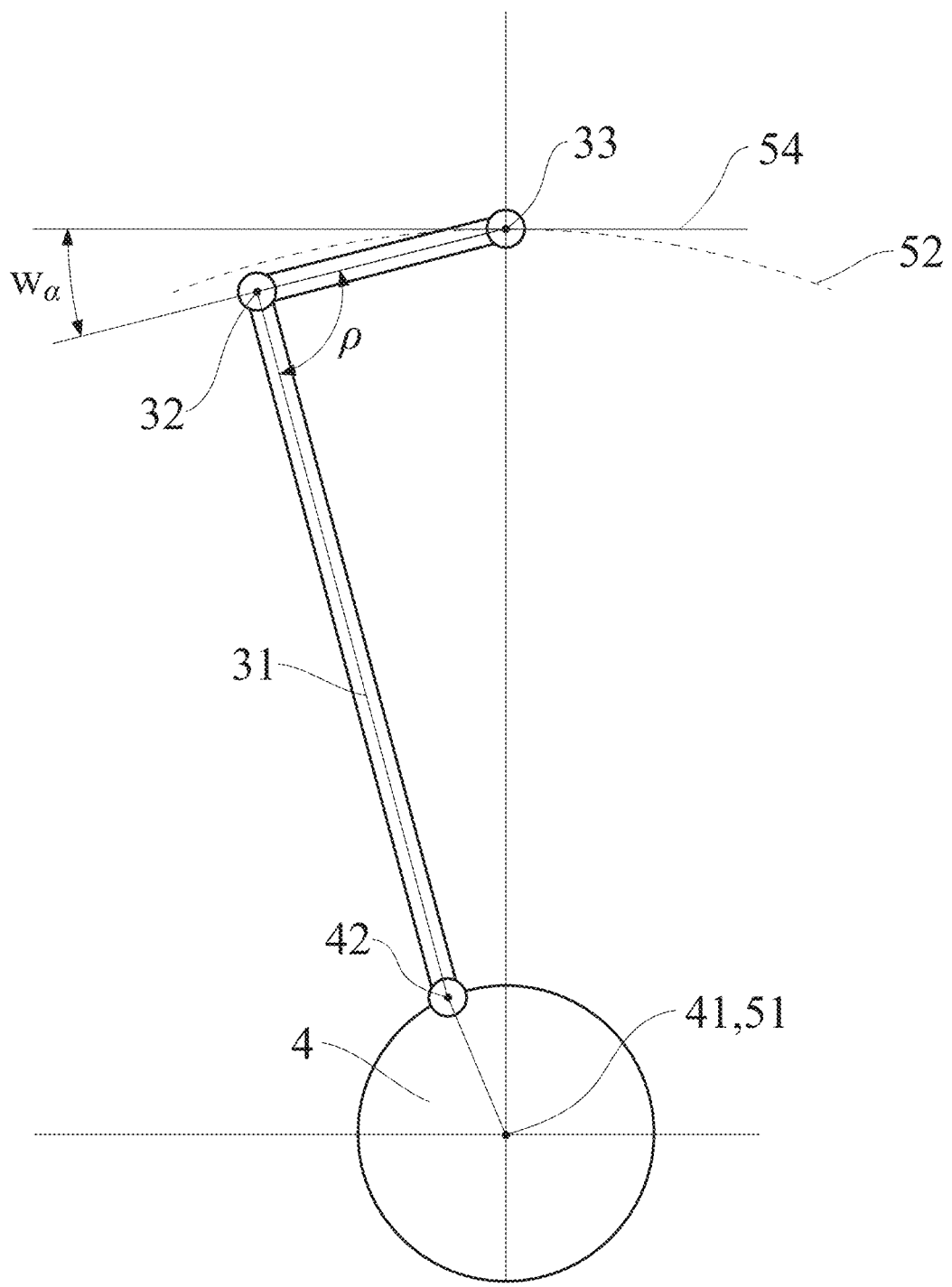
Figure 4:
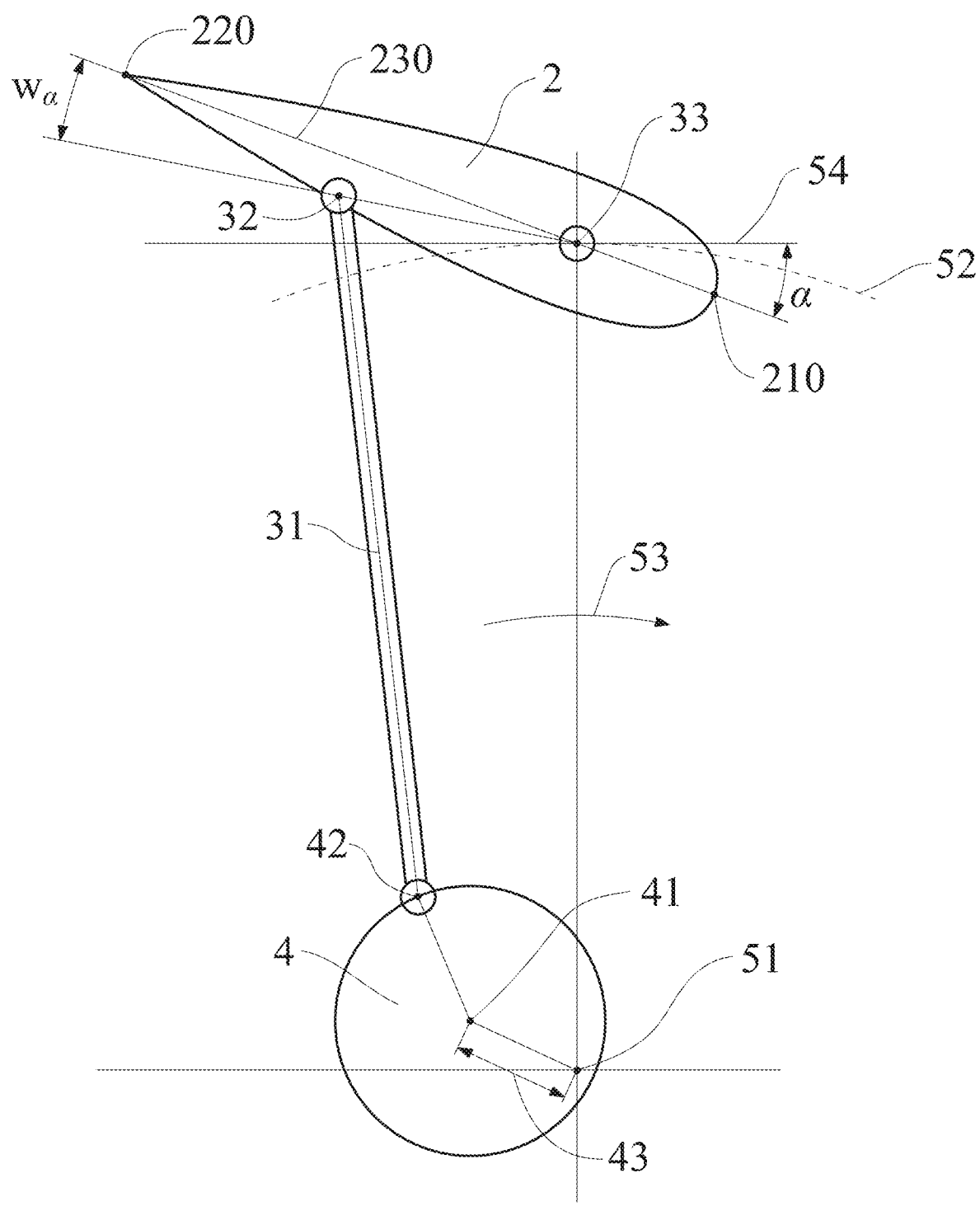
Figure 5A:
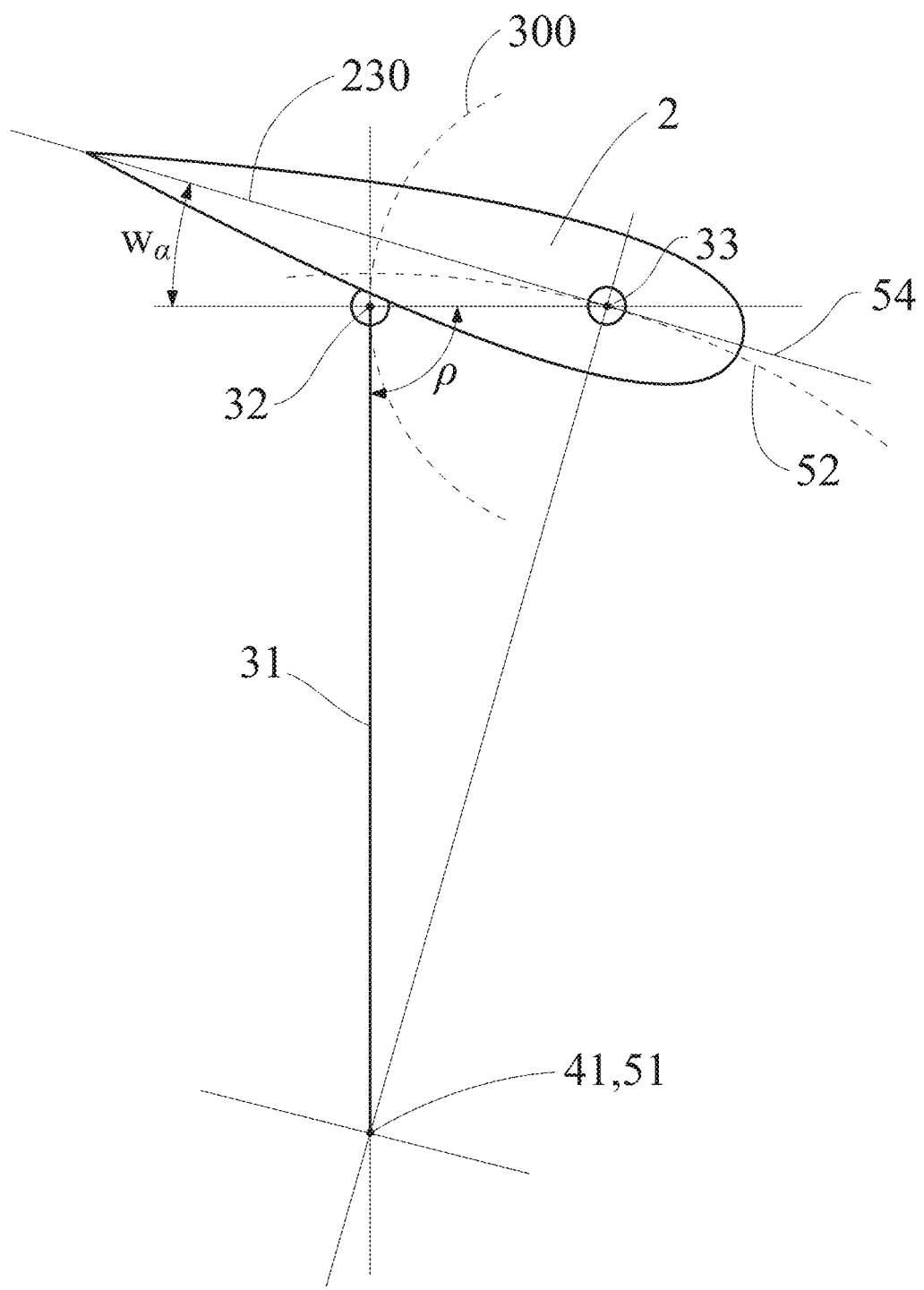
Figure 5B:
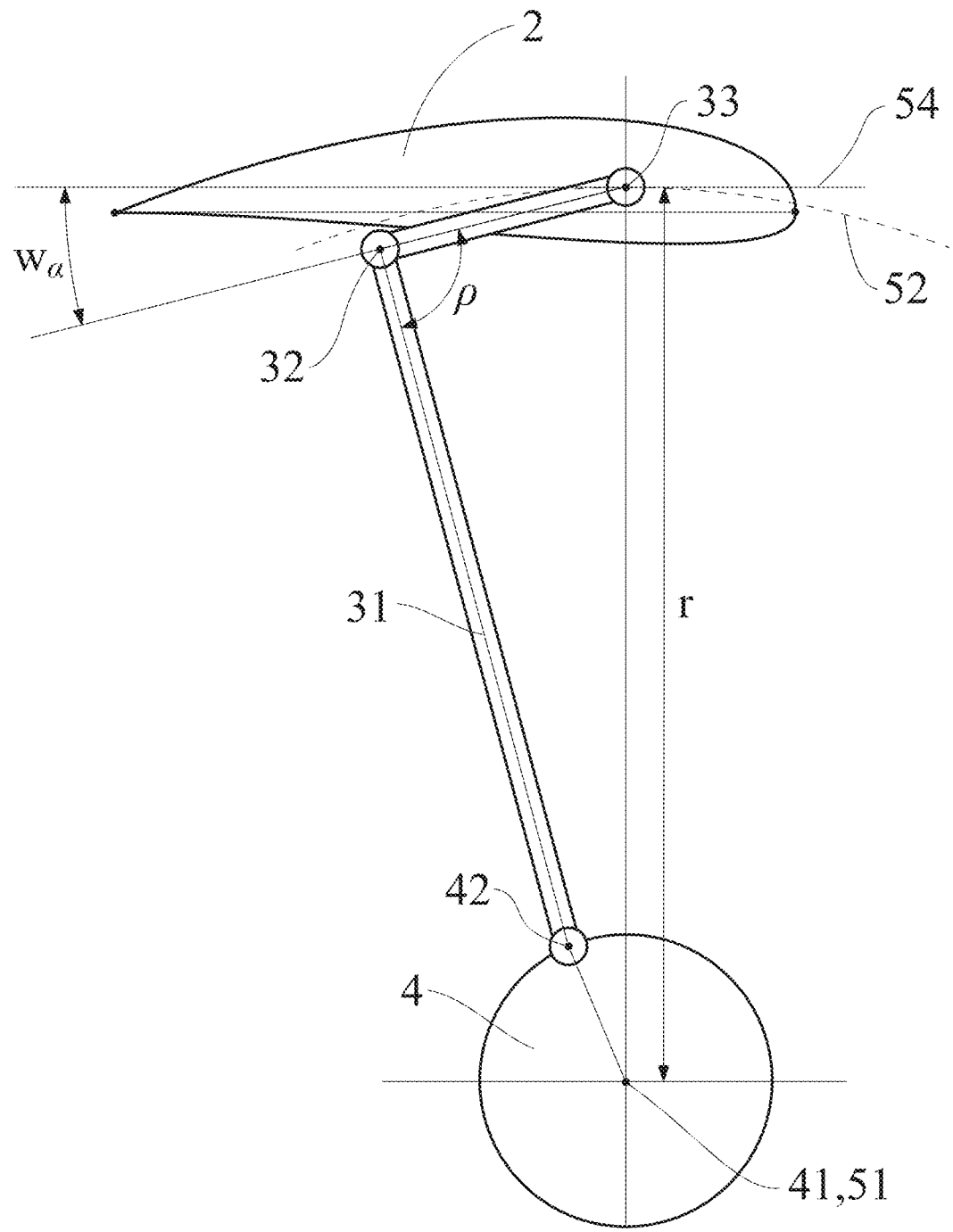
Figure 5C:
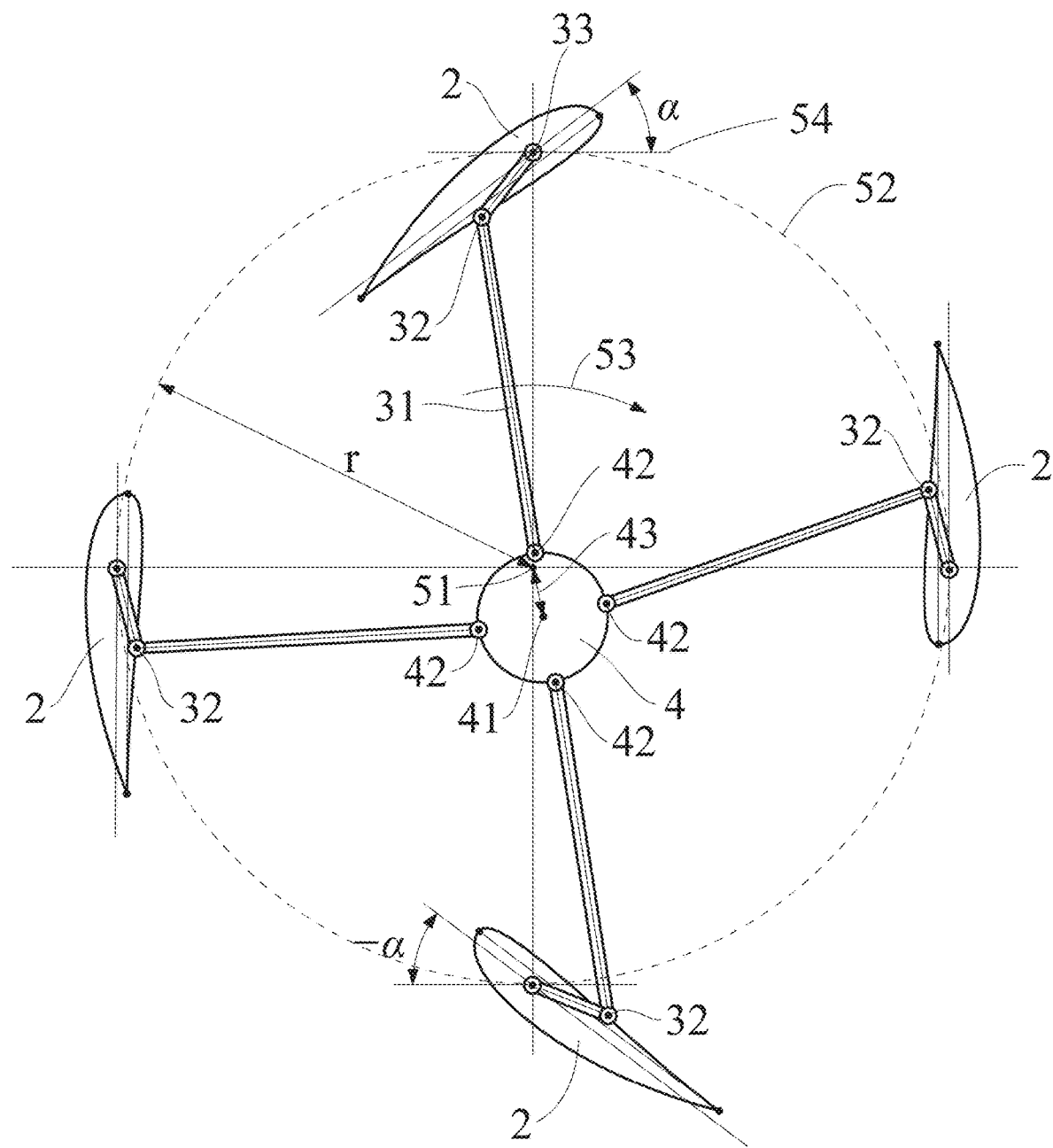
Figure 6:
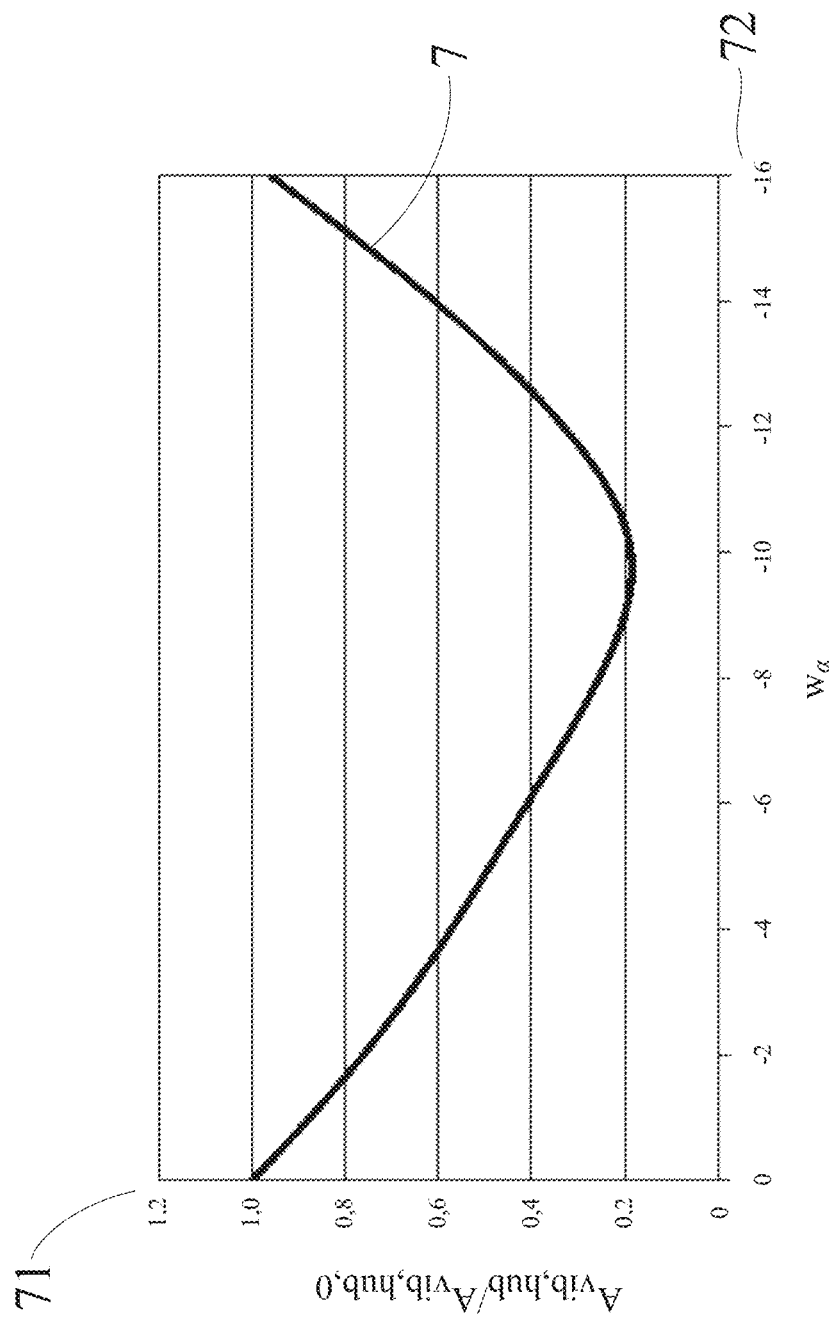
Figure 7A:
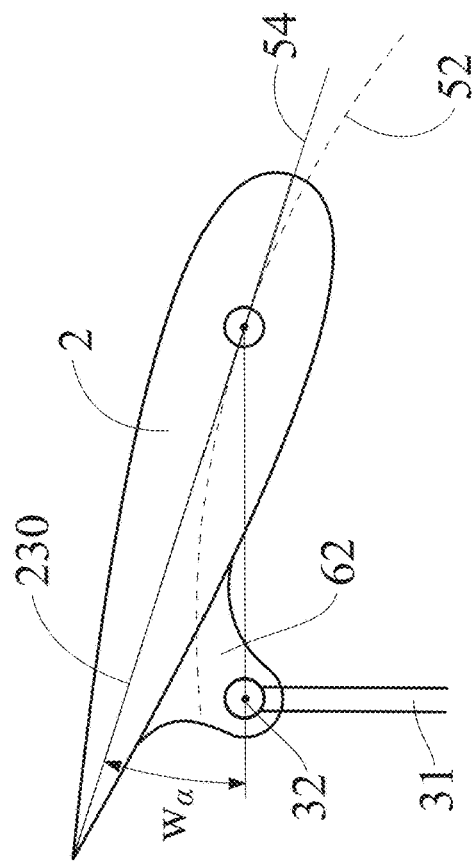
Figure 7B:
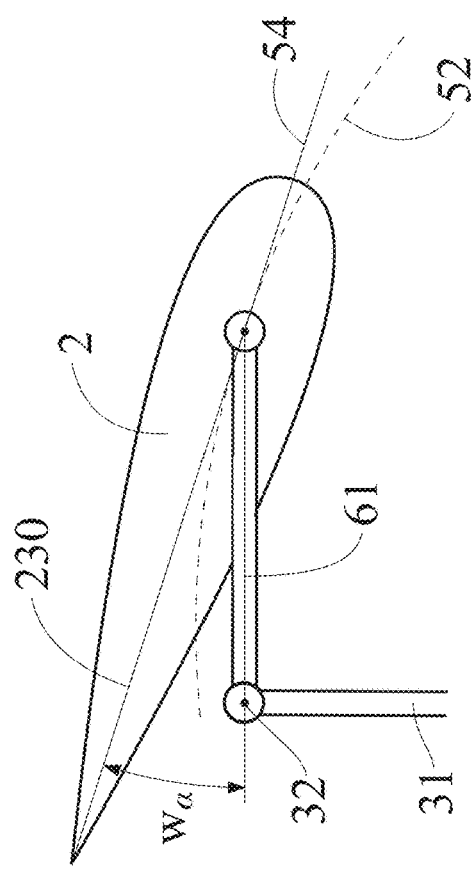
Figure 8:
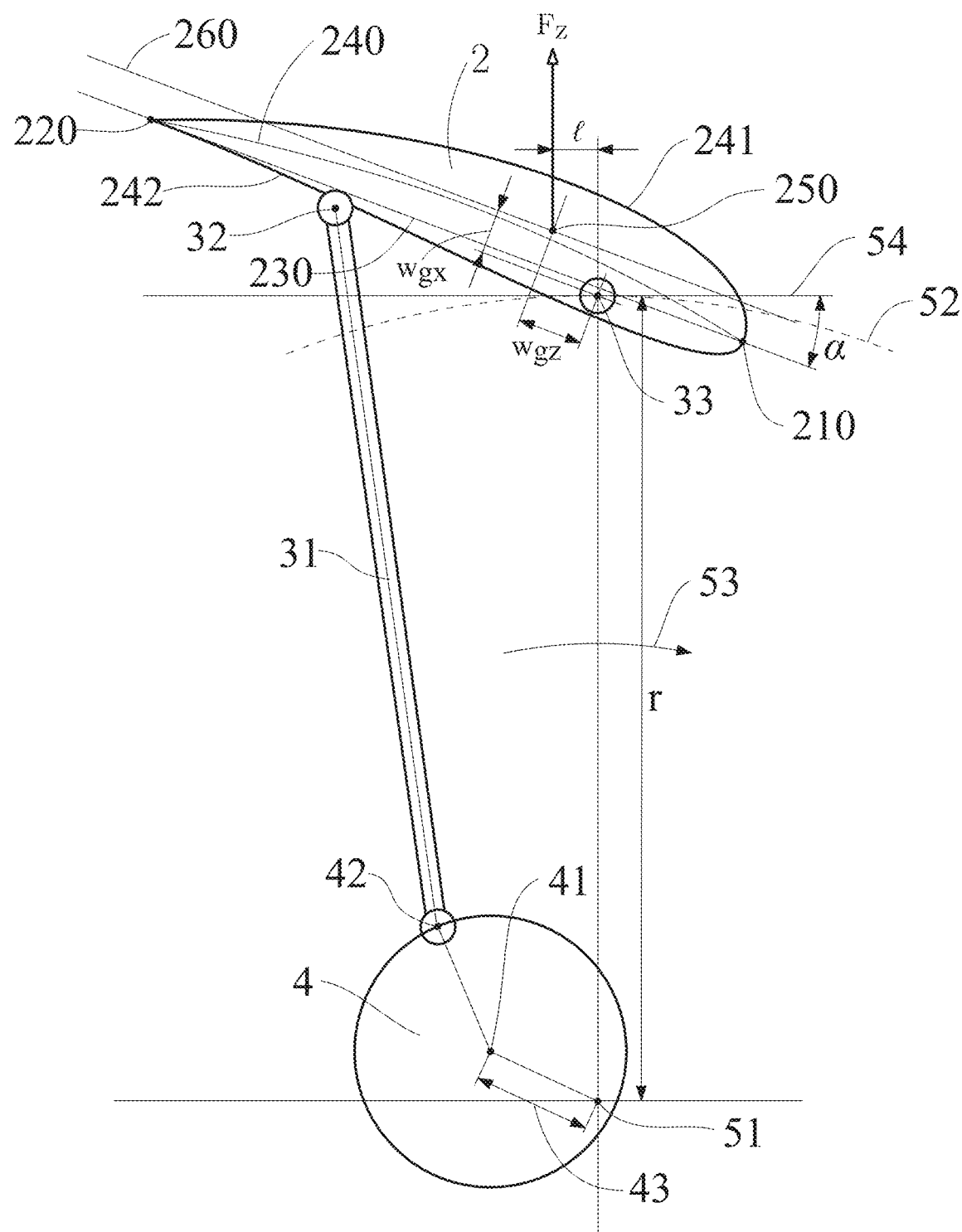
Figure 9:
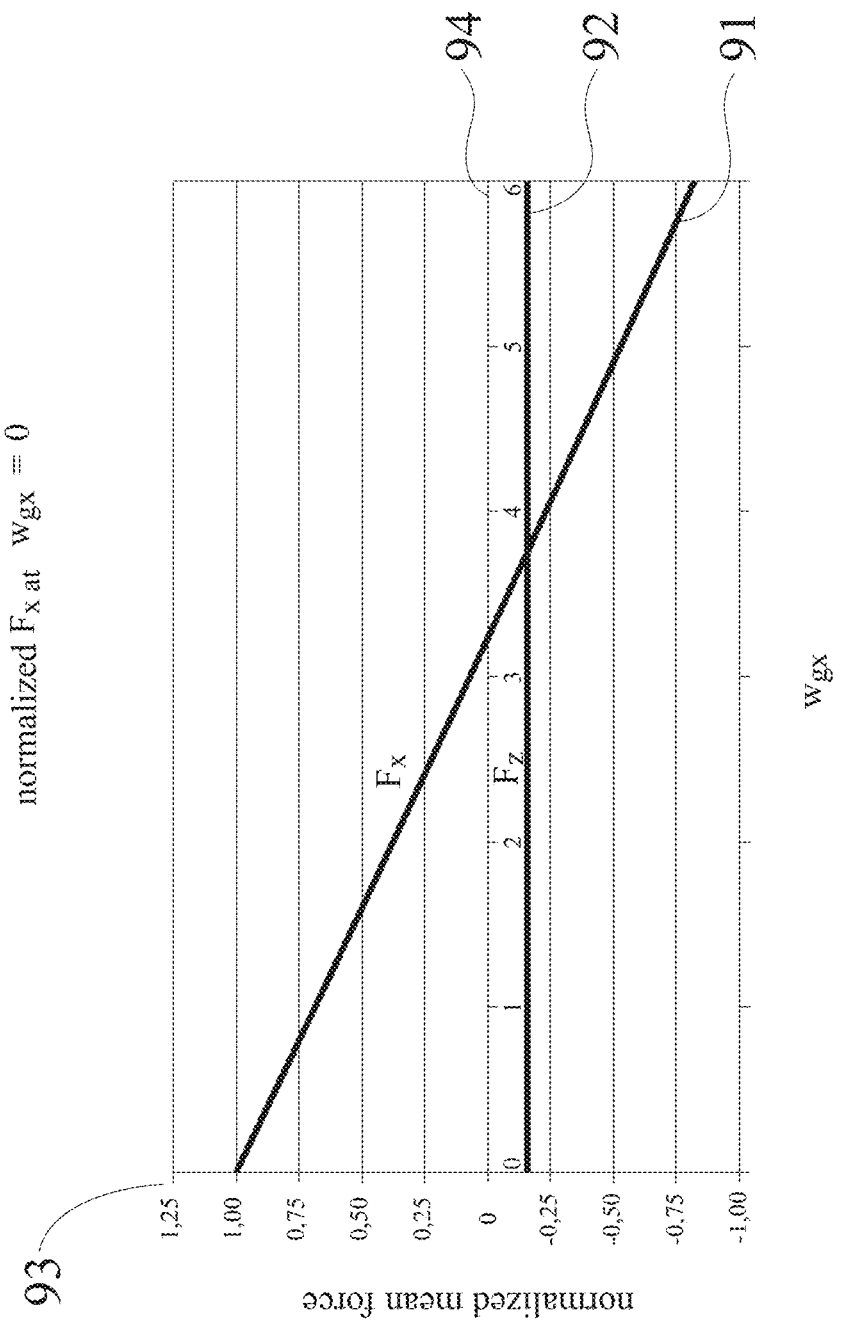

In the following preferred embodiments of the present invention will be described by means of the following Figures. There show:

FIG. 1: a perspective view of an aircraft with a plurality of propulsion devices in accordance with the invention;

FIG. 2: a perspective view of a propulsion device in accordance with the invention;

FIG. 3: a profile view of a pitch mechanism coupled to an offset device in accordance with the first embodiment of the invention for defining the certain, non-vanishing angle;

FIG. 4: a profile view of a blade coupled to an offset device with a coupling device in accordance with the first embodiment of the invention;

FIG. 5a: a schematic diagram of the mode of functioning of the coupling of the coupling device at a coupling point of the blade in accordance with the invention;

FIG. 5b: a profile view of a blade coupled to an offset device with a coupling device, with a coupling point selected in an optimum position for reducing the loads on the offset device and/or eccentric bearing axis;

FIG. 5c: a propulsion device in accordance with the invention in a profile view at a rotor with four blades, wherein the coupling point is positioned optimally with all blades;

FIG. 6: a parameter study concerning the influence of the position of the coupling point of the blade on the loads on the offset device;

FIG. 7a: a first constructive variant of the first embodiment using a connection element for implementing the positioning of the coupling point in accordance with the invention;

FIG. 7b: a second constructive variant of the first embodiment using a connection to the blade for implementing the positioning of the coupling point in accordance with the invention;

FIG. 8: a profile view of a blade coupled to an offset device with a coupling device in accordance with the second aspect of the invention;

FIG. 9: a parameter study concerning the influence of the distance of the blade bearing point from the center of mass on the forces at the offset device;

FIG. 10: a Table indicating the loads on the offset device due to harmonic vibrations as a function of the number of blades.

FIG. 1 shows a perspective view of an aircraft 100 with a plurality of propulsion devices 1 in accordance with the invention. The illustrated aircraft 100 comprises four propulsion devices 1. The illustrated propulsion devices 1 are cyclogyro rotors. The aircraft 100 illustrated in FIG. 1 may therefore also be referred to as cyclogyro. The propulsion devices will be described in detail in connection with the following Figures. Each of these propulsion devices 1 is mounted for rotating about an axis of rotation. Each propulsion device 1 comprises a plurality of blades 2 which are mounted for pivoting about their longitudinal axes. Thus, it is possible to vary the pitch angle of the blades 2 during the rotation of the propulsion device 1. By controlling the speed of rotation of the propulsion devices 1 and the control of the pitch angles of the blades 2 it is possible to vary the amount and the direction of the thrust generated. The aircraft 100 comprises at its front side two major propulsion devices 1. At its rear side the aircraft 100 comprises to minor propulsion devices 1.

The illustrated aircraft 100 may, for instance, be an air vehicle, a manned aerial vehicle, a drone, or so-called Micro Air Vehicles (MAVs).

FIG. 2 illustrates a propulsion device 1 in accordance with the invention in a perspective view. This propulsion device 1 comprises five blades 2, respectively associated pitch mechanisms 3, an offset device 4 and a disk 11. The blades 2 are mounted for rotating about an axis of rotation of the propulsion device 1. The offset device 4 defines an eccentric bearing axis which is mounted eccentrically with respect to the axis of rotation of the propulsion device 1. In FIG. 2 the offset device is illustrated as an offset disk. The offset disc is mounted for rotating freely about the eccentric bearing axis. The eccentric bearing of the offset disk 4 implies an eccentric bearing of the pitch mechanism 3. The eccentric bearing of the pitch mechanism 3 effects the changing of the position of the blades 2 during a revolution about the axis of rotation of the propulsion device 1. Each of the illustrated pitch mechanisms 3 comprises a coupling device 31 and a bearing device 33. Each blade 2 is mounted for pivoting by the corresponding bearing device 33. The blade 2 is mounted about an axis parallel to the axis of rotation of the propulsion device 1. This axis is the blade bearing axis 33. The bearing of the blade 2 may, for instance, take place by a bearing means such as one or a plurality of pins, a so-called main pin. The bearing means is preferably a part of the bearing device 33. The blade bearing axis 33 may extend through the center of mass of the blade 2. Preferably, however, a bearing of the blade 2 takes place at a distance from the center of mass. The coupling device 31 of the pitch mechanism 3 couples the blade 2 to the offset device 4 in such a way that the blade 2 performs a pitch movement when it rotates about the axis of rotation of the propulsion device 1, and provided that the eccentric bearing axis does not coincide with the axis of rotation of the propulsion device 1. One end piece of the coupling device 31 is coupled to the offset device 4 at a connection point. The other end piece of the coupling device 31 is coupled to the blade 2.

The offset disk 4 is mounted for rotating freely. The axis of rotation of the offset disk 4 extends preferably at a certain offset distance parallel to the axis of rotation of the propulsion device 1. This produces the eccentric bearing of the offset disk 4 relative to the axis of rotation of the propulsion device 1. This offset distance may be adjustable. An offset device 4 with adjustable eccentricity may, for instance, be implemented by a planetary gear. A pitch movement of the blades 2 results when the offset distance is nonzero.

The coupling of the coupling device 31 to the blade 2 takes place at a coupling point 32. For this purpose the coupling device 31 may comprise a coupling means. In the propulsion device 1 illustrated in FIG. 2 the coupling device 31 comprises a conrod as well as a pin, the so-called pitch link pin. The pin is a constructive design of the coupling means in accordance with the invention. In the embodiment illustrated in FIG. 2 the coupling of the coupling device 31 to the blade 2 at the coupling point 32 is not performed by a direct connection with the blade 2, but by using a connection element 61. One end of the connection element 61 is rigidly connected with the blade 2. This connection takes place preferably at the blade bearing point. The other end of the connection element 61 is coupled to the coupling device/conrod 31. In this case the pitch movement is, via the coupling element by means of the conrod 31, introduced indirectly via the connection element 61 into the blade 2.

A direct coupling of the coupling device 31 to the blade 2 is, however, also possible in accordance with the invention.

Due to the fact that the coupling device 31 of the pitch mechanism is mounted eccentrically with respect to the axis of rotation of the propulsion device 1, the coupling point 32 moves relative to the blade bearing axis 33 on a circular arc when the blade 2 rotates about the axis of rotation of the propulsion device 1. This produces the pitch movement of the blade 2. It is thus a pendular movement of the blade 2 about the blade bearing axis 33.

Furthermore, the propulsion device 1 illustrated in FIG. 2 comprises a disk 11. This disk 11 is designed such that it separates the blades 2 aerodynamically from the remaining components of the propulsion device 1. Such a disk 11 is of particular advantage for the case that the propulsion device 1 is operated at higher speeds.

In an embodiment according to the invention in accordance with the first aspect of the invention the coupling device 31 is coupled to the blade 2 at a coupling point 32 which is positioned such that the plane that comprises the blade bearing axis 33 and the coupling point 32 and the tangential plane to the circular path through the blade bearing axis 33 include a certain, non-vanishing angle when the offset distance is set to zero. The blades 2 illustrated in FIG. 2 have a symmetric profile. A detailed description of the coupling device 31 in accordance with the invention will be found in particular in connection with FIG. 3.

The propulsion device 1 generates thrust due to two rotational movements coupled with one another. The first rotational movement is the rotation of the blades 2 about the axis of rotation of the propulsion device 1. This first rotational movement results in a movement of the blades 2 about the axis of rotation of the propulsion device along a circular path. Specifically, the blade bearing axes 33 and/or blade bearing points move along the circular path. Each blade bearing axis 33 is parallel to the longitudinal axis of the blades 2. The longitudinal axis of the blades 2 is parallel to the axis of rotation of the propulsion device 1. Thus, the longitudinal axis of the blades 2 is also parallel to the blade bearing axis 33. The direction of thrust of the propulsion device 1 is normal to the axis of rotation of the propulsion device 1. For an optimum thrust generation all blades 2 are to be oriented best possible to the direction of flow at any point of time. This ensures that each blade 2 makes a maximum contribution to the total thrust. During the rotation of the propulsion device 1 about its axis of rotation the pitch of each blade 2 is changed continuously due to the afore-described pitch mechanism. Each blade 2 performs a periodic change of the pitch angle and/or a pendular movement. This is the pitch movement. In this process the coupling point 32 moves on a circular arc about the blade bearing axis 33. This is the second rotational movement.

The amount and the direction of the thrust generated depend on the pitch of the blades 2. Therefore, the distance of the eccentric bearing of the offset device 4 and/or of the pitch mechanism 3 from the axis of rotation of the propulsion device 1 influences the amount of the thrust generated. By the shifting of the eccentric bearing of the offset device 4 in the circumferential direction, i.e. with a constant distance from the axis of rotation of the propulsion device 1, the direction of the thrust generated is changed.

Although in FIG. 2 pitch mechanisms 3 are illustrated at one side of the propulsion device 1 only, it may be expedient for reasons of stability to apply corresponding pitch mechanisms also at the opposite side of the propulsion device.

FIG. 3 shows a part of a propulsion device in accordance with the first aspect of the invention in a profile view. FIG. 3 illustrates a pitch mechanism and an offset device 4. The pitch mechanism comprises a coupling device 31 and a bearing device 33. Moreover, a part of the circular path 52 is indicated, along which the blade bearing axis 33 moves. Also illustrated is the tangent 54 to said circular path. The first aspect of the invention manages completely without the specific geometry of a blade. Therefore, no specific blade profile is drawn in FIG. 3. In accordance with the invention it is only the positioning of the coupling point 32 relative to the tangent 54 that is important. More specifically, the angle $w_\alpha$ included by the tangent 54 and the connection straight line through the blade bearing point 33 and the coupling point 32 is crucial in accordance with the invention. The angle $w_\alpha$ is determined in the configuration of the offset device in which no eccentricity exists, i.e. when the offset distance is set to zero, as illustrated in FIG. 3. This is equivalent with the axis of rotation 51 of the propulsion device coinciding with the eccentric bearing axis 41. The effect in accordance with the invention, i.e. the reduction of loads at the offset device 4 and/or at the eccentric bearing axis 41, occurs when the angle $w_\alpha$ assumes a non-vanishing value. This will be shown below in connection with FIG. 6. Instead of the angle $w_\alpha$ it may be expedient to consider the angle ρ which is included by the connection line of blade bearing axis 33 to coupling point 32, on the one hand, and by the connection line from the coupling point 32 to the axis of rotation 51, on the other hand.

It has to be noted that a so-called offset disk is shown in FIG. 3. The coupling device 31 is coupled at a connection point 42 of the offset disk which has a certain distance from the bearing axis 41 of the offset disk. Due to the fact that the offset disk is mounted for rotating, however, this does not yet result in a pitch movement. Only when the bearing axis 41 of the offset disk 4 is shifted relative to the axis of rotation 51 of the propulsion device radially by an offset distance does the pitch movement occur.

Finally, it has to be noted that FIG. 3 illustrates the part of the propulsion device in accordance with the invention as a cross-section in profile. When considering the extension of the propulsion device in the third, non-illustrated, dimension, planes will possibly have to be considered instead of straight lines when defining $w_\alpha$. In a general form there applies: The coupling point 32 is positioned such that the plane that comprises the blade bearing axis 33 and the coupling point 32 and the tangential plane 54 to the circular path 52 through the blade bearing axis 33 include a certain, non-vanishing angle $w_\alpha$ when the offset distance is set to zero.

If, in the following, two-dimensional dimensions are referred to for simplifying matters, this implies that they are possibly mentioned representatively for corresponding three-dimensional dimensions.

FIG. 4 illustrates a part of a propulsion device in accordance with the first aspect of the invention in a profile view. FIG. 4 shows a blade 2, a pitch mechanism and an offset device 4. The pitch mechanism comprises a coupling device 31 and a bearing device 33. To simplify illustration, a blade 2 with a symmetrical profile will be considered here. The blade 2 is mounted for pivoting about the blade bearing axis 33 by means of the bearing device 33. The coupling device 31 is coupled to the blade 2 at the coupling point 32. The coupling point 32 is positioned such that the plane that comprises the blade bearing axis 33 and the coupling point 32 and the tangential plane 54 to the circular path through the blade bearing axis 33 include a certain, non-vanishing angle $w_\alpha$. The angle $w_\alpha$ is determined in the configuration of the offset device in which no eccentricity exists, i.e. when the offset distance 43 is set to zero. The chord 230 is defined as the connection between the leading edge 210 and the trailing edge 220 of the blade. The definition of $w_\alpha$ was already described above in connection with FIG. 3. The illustrated coupling device 31 is coupled with one end to the blade directly at the coupling point 32. That means that the coupling device 31 is, for instance, by using a coupling means such as a pin, directly connected with the blade 2 for moving. An indirect coupling of the coupling device 31 to the blade 2 is also possible; this will be described further below in connection with FIG. 7a.

The blade 2 may rotate along the axis of rotation 51 of the propulsion device about a circular path 52. The direction of rotation is indicated by the arrow 53; it is thus assumed that the blade rotates clockwise. The illustrated offset device 4 is an offset disk. It is mounted for rotating about an eccentric bearing axis 41. Preferably, the offset device 4 may rotate freely about this eccentric bearing axis 41. The eccentric bearing axis 41 of the offset device 4 is shifted parallel by a distance 43 relative to the axis of rotation 51 of the propulsion device. Due to this lateral displacement 43 the offset device 4 is mounted eccentrically relative to the axis of rotation 51. At the coupling point 42 of the offset disk 4 the coupling device 41 is coupled to the offset disk 4.

The chord 230 of the blade 2 illustrated in FIG. 4 is inclined by the angle α relative to the tangent 54 at the blade bearing point 33 to the circular path 52 which is described by the blade bearing point 33 during the rotation about the axis of rotation 51. This is the so-called pitch angle. The pitch movement occurs due to the eccentric bearing of the eccentric bearing axis 41 of the offset device 4 relative to the axis of rotation 51 of the propulsion device. FIG. 4 shows that, due to the eccentric bearing of the offset device 4, also the coupling point 42 of the coupling device 31 of the pitch mechanism passes along an eccentric path relative to the axis of rotation 51. The consequence of this is that the radial distance of the coupling point 42 changes during the rotation of the blade 2 relative to the circular path 52 on which the blade bearing axis 33 moves along. Thus, also the position of the coupling point 32 changes relative to this circular path 52. The effect of this is that the blade 2 performs a pitch movement α. In other words, the blade 2 lifts and lowers relative to the circular path 52. In even other words, the blade 2 performs a pendular movement about the circular path 52 while moving along the circular path 52. This pendular movement and/or the lifting and lowering of the blade 2 is indicated by the angle α. This is the so-called pitch angle. The angle α indicates the angle included by the tangent 54 at the blade bearing point 33 to the circular path 52 and the chord 230. It is of advantage to choose the maximum amplitude of the pitch movement such that the angle α can vary in a range of between −50° and +50°. Such angles are of advantage specifically for cyclogyro rotors so as to generate a relevant thrust.

The coupling point 32 moves during the pitch movement α on a circular arc about the blade bearing axis 33. This movement results in that the blade 2, during its movement along the circular path 52, performs a pendular movement about the axis of rotation 51 which comprises, in addition to a fundamental harmonic vibration, also higher harmonic values. These higher harmonic values are pronounced stronger the larger the pitch angle α becomes. In the case of the afore-mentioned angle range of −50° to +50° the higher harmonic values can no longer be neglected.

The positioning of the coupling point 32 in accordance with the invention provides a possibility of influencing the higher harmonic values mentioned.

FIG. 5a illustrates schematically how the positioning of the coupling point 32 in accordance with the invention leads to the influencing and reducing of the higher harmonic values of the pitch movement. In FIG. 5a the pitch mechanism is illustrated for the case that the axis of rotation 51 of the propulsion device matches with the eccentric bearing axis 41 of the offset device. In other words, the eccentricity of the eccentric bearing axis 41 relative to the axis of rotation is zero. In even other words, no pitch movement occurs in the illustrated case. In exactly this configuration the angle $w_\alpha$ is defined and determined in accordance with the invention. A pitch movement introduced into the blade 2 by the coupling device 31 by coupling at the coupling point 32 only occurs when the eccentric bearing axis 41 of the offset device is again displaced by a certain distance from the axis of rotation 51 of the propulsion device. In this case the coupling point 32 moves along a circular arc 300 about the blade bearing axis 33.

In the case of a suitable choice of the angle $w_\alpha$ the angle ρ which lies between the connection of the blade bearing point 33 with the coupling point 32, on the one hand, and the connection of the coupling point 32 with the axis of rotation 51 of the propulsion device and/or the eccentric bearing axis 41 of the offset device, on the other hand, is a right angle.

If the angle $w_\alpha$ is chosen such that the angle ρ which is included by the connection line between the blade bearing point 33 and the coupling point 32, on the one hand, and the connection line between the coupling point 32 and the axis of rotation 51 of the propulsion device, on the other hand, is 90°, it results that the geometric deviation of the circular arc 300 from the tangent to the circular arc 300 at the coupling point 32 is distributed symmetrically. This means that, by the choice of a right angle, as described before, a symmetrization of the movement of the coupling point 32 relative to the tangent to the circular arc 300 is produced. This is equivalent with the fact that no even higher harmonic values exist in the pitch movement. All even higher harmonic values of the pitch movement can therefore be minimized by means of the angle $w_\alpha$.

The higher harmonic values of the pitch movement lead to forces in the coupling device 31. The coupling device 31 transfers these forces to the offset device and/or the eccentric bearing axis 41. This causes loads at the offset device. Due to the fact that the even higher harmonic values of the pitch movement are minimized by a positioning of the coupling point 32 in accordance with the invention, the corresponding loads at the offset device and/or at the eccentric bearing axis 41 are also minimized.

Although the optimum position of the coupling point 32 exists when the angle ρ which is included by the connection line between the blade bearing point 33 and the coupling point 32, on the one hand, and the connection line between the coupling point 32 and the axis of rotation 51 of the propulsion device, on the other hand, is 90°, a reduction of the loads at the offset device also occurs with other angles $w_\alpha$ which do not necessarily result in a right angle ρ.

Corresponding model calculations will be described with respect to FIG. 6.

FIG. 5b illustrates a section from a propulsion device in accordance with the invention in profile, wherein the coupling point 32 is positioned optimally. This means that in the illustrated configuration the even higher harmonic values of the pitch movement are reduced best possible. FIG. 5b illustrates the general case with an asymmetrical blade profile. The angle ρ which is included by the connection line between the blade bearing point 33 and the coupling point 32, on the one hand, and the connection line between the coupling point 32 and the axis of rotation 51 of the propulsion device, on the other hand, is 90°. As described before in connection with FIG. 5a, the positioning of the coupling point 32 and hence the setting of the angle ρ takes place under the premise of vanishing eccentricity, i.e. the eccentric bearing axis 41 of the offset device 4 coincides with the axis of rotation 51 of the propulsion device.

Due to the finite dimensions of the offset device 4 the connection point 42 of the coupling device 31 to the offset device 41 does not coincide identically with the eccentric bearing axis 41 of the offset device 4. The radius r of the circular path 52 along which the blade 2 moves during the rotation about the axis of rotation 51 is regularly distinctly larger than the distance of the connection point 42 from the eccentric bearing axis 41. Therefore, it is also possible to optimize the angle ρ which is included by the connection line between the blade bearing point 33 and the coupling point 32, on the one hand, and the connection line between the coupling point 32 and the connection point 42 of the offset device 4, on the other hand, i.e. to set it to almost 90°, without suffering any loss in the reduction of loads at the offset device 4.

FIG. 5c shows a propulsion device in accordance with the invention in a profile view at a rotor with four blades 2. Each of the blades 2 may move about the axis of rotation 51 of the propulsion device on a circular path 52 with the radius r. Each blade 2 is coupled to the offset device 4 at a coupling point 42. In the illustrated example the blades 2 rotate clockwise, as indicated by the arrow 53. In FIG. 5c the propulsion device is shown with non-vanishing eccentricity, i.e. the eccentric bearing axis 41 is shifted from the axis of rotation 51 by a non-vanishing offset distance 43. As explained already further above, this results in a pitch movement α of the blades 2. The coupling point 32 of each blade 2 has been positioned optimally. This means, as described especially with respect to FIGS. 3, 5a and 5b, the angle included by the connection straight line through the blade bearing point 33 and the coupling point 32 as well as by the coupling device 31 was set to almost 90. This angle was determined in the configuration of the offset device 4 in which no eccentricity exists, i.e. when the offset distance was set to zero.

Although the specific geometry, bearing, or the specific profile of the blades 2 is not important for achieving the effect in accordance with the invention—as already explained above—(crucial is the relative arrangement of blade bearing point 33, coupling point 32 and coupling device 31 with vanishing offset distance 43), it is assumed in the embodiment illustrated in FIG. 5c that the chords of the blades 2, with an offset distance zero, did not show any twist relative to the tangent 54 to the circular path 52. With this initial configuration the occurrence of the minimization of the even harmonic values of the pitch movement can be illustrated particularly well. This is because with the illustrated rotor with four blades 2 with optimal positioning of the coupling point 32 the minimization of the even harmonic values of the pitch movement manifests itself such that the opposing blades 2 each have the negative pitch angle α and/or −α of the other one. In the illustrated position the uppermost blade is at its maximum positive deflection a, the lowermost blade at its maximum negative deflection −α. The two other blades are in a middle position with a deflection of zero degrees.

For the sake of completeness it is mentioned that, due to the fact that the even higher harmonic values, under real conditions of operation, are only minimized and do not disappear completely, the opposing blade only comprises approximately the negative deflection value of the respectively other one.

FIG. 6 shows a graph 7 indicating the peak-to-peak value of the load at the offset device, $A_{vib,hub}$, normalized to the peak-to-peak value of the loads at the offset device for $w_\alpha=0$, $A_{vib,hub,0}$ a function of the angle $w_\alpha$. The peak-to-peak value describes the difference between the minimum and maximum values of the load at the offset device and is thus a direct measure for the vibration of the load at the offset device. The ordinate 71 indicates the function value $A_{vib,hub}/A_{vib,hub,0}$, the abscissa 72 the angle $w_\alpha$ measured in degrees.

The loads at the offset device and/or at the eccentric bearing axis as a function of the value $w_\alpha$ were calculated by using a further calculation of all forces and moments and an additional consideration of aerodynamic loads. The reduction of the loads at the offset device can be recognized clearly. Specifically, it results from the progression of the graph 7 that a reduction of the loads at the offset device occurs as soon as the coupling point is positioned in accordance with the invention. In operation, the angle between a coupling device and the connection line between the coupling point and the blade bearing point must be sufficiently acute at any point of time. Otherwise, self-retention would occur and the function of the pitch mechanism would no longer be given. Experience has shown that, with respect to a maximum pitch angle of 50°, the twist $w_\alpha$ is restricted to maximally 20°. This means that an improvement compared to the coupling of the coupling device at the tangent to the circular path (considered for the case that no eccentricity exists) always occurs under realistic conditions of use in accordance with the invention.

FIG. 6 illustrates that the minimum of the load at the offset device occurs at an angle $w_\alpha$ of approximately 10°. Taking into account the geometry underlying the model calculation, this corresponds actually approximately to a right angle between the connection line of blade bearing point to coupling point, on the one hand, and the connection line of coupling point to the axis of rotation of the propulsion device, on the other hand.

FIGS. 7a and 7b illustrate two variants in accordance with the invention for coupling the coupling device 31 to the blade 2. In both FIGS. 7a and 7b symmetrical blade profiles are shown. It is assumed that the offset distance is set to zero.

FIG. 7a illustrates an indirect coupling of the coupling device 31 to the blade 2. This means that the coupling point 32 is not positioned directly at the blade 2. The illustrated coupling point 32 is positioned outside of the blade profile.

Coupling takes place via a connection element 61. The connection element 61 may be a lever arm. The connection element is connected with one end rigidly to the blade 2. It is illustrated that the connection element 61 is connected with the blade 2 with the aid of the bearing device 33, preferably with a bearing means such as a pin, the so-called main pin. The other end of the connection element 61 is movably connected with the coupling device 31 at the coupling point 32. The coupling point 32 is positioned away from the tangent 54 by an angle $w_\alpha$.

Due to the use of the connection element 61 as a separate structural element for coupling the coupling device 31 at the blade 2 only one bearing means, such as for instance a main pin, is required. This means that the stability of the blade 2 is impaired by the bearing device 33 at one place only, a second load such as for fastening the coupling device 31 directly at the blade 2 by an appropriate coupling means, such as for instance a further pin, is thus omitted. Due to the fact that the connection element 61 is connected rigidly at the outside with the bearing device 33 or with the bearing means and hence with the blade 2, the pitch movement is introduced into the blade 2 via a moment in the bearing device 33 and/or in the bearing means.

The variant shown in FIG. 7a yields several advantages. First, the optimum positioning of the coupling point 32 of the coupling device 31 at the blade 2 can be implemented in a particularly simple manner by the connection means 61. The angle can simply be adjusted by twisting the connection element 61 about the blade bearing axis 33 such that the angle ρ which is included by the connection element 61 and the coupling device/conrod 31 is approximately 90°. As described with respect to FIGS. 5a and 5b, an almost optimum position of the coupling point 32 is thus determined.

Furthermore, the total weight of the pitch mechanism together with the connection means 61 is lower than with a conventional direct coupling of the coupling device 31 to the blade 2 since the additional coupling means, such as an additional pin, for the introduction of forces is omitted. Moreover, the introduction of forces for the pitch movement takes place via the bearing device 33 and/or via the bearing means and hence regularly at the thickest place of the blade 2. Thus, the forces occurring can be better distributed in the blade 2. This in turn enables an improved construction and a further weight reduction of the propulsion device.

Finally, a further advantage results with propulsion devices providing a disk for the aerodynamic separation of the blades from the rest of the components of the propulsion device, such as it is for instance illustrated in FIG. 2 (designated with reference number 11 there). The coupling of the coupling device 31 to the blade 2 with the aid of a connection element 61 avoids the necessity of providing an additional recess in the disk for the connection of the coupling device 31 at the blade 2. Thus, a simpler construction of the disk is enabled. Moreover, the aerodynamics of the propulsion device is improved.

FIG. 7b shows a further variant of a connection element 62 for the coupling of the coupling device 31 at a coupling point 32 to the blade 2. The coupling point 32 is spaced apart from the tangent 54 by the angle $w_\alpha$. The coupling point 32 is positioned outside of the blade profile. The connection element 62 is fastened at the lower side of the blade at a position far from the bearing device 33. One end of the coupling device 33 is mounted for moving at the coupling point 32 of the connection element.

FIG. 8 shows a blade 2, a pitch mechanism and an offset device 4 of a propulsion device according to the second aspect of the invention. The profile of the blade 2 illustrated in FIG. 8 is asymmetrical. The part of a propulsion device in accordance with the invention illustrated in FIG. 8 differs from the corresponding part of the propulsion device illustrated in FIG. 4 in that the blade bearing axis 33 is arranged at a certain distance w from the center of mass 250 of the blade 2. More specifically: The blade bearing axis 33 is, relative to the plane 260 extending through the center of mass 250 of the blade and parallel to both the axis of rotation 51 and the chord 230 of the blade, shifted by the distance w toward the axis of rotation 51 of the propulsion device. In FIG. 8 the propulsion device is shown with an eccentric bearing axis 41 which is shifted from the axis of rotation 51 by an offset distance 43.

The chord 230 is defined as the connection line between the leading edge 210 and the trailing edge 220 of the blade 2. The leading edge 210 and the trailing edge 220 are given by the intersections of the camber line 240 with the profile contour. The camber line 240 is in turn defined as the line consisting of the centers between the upper side 241 and the lower side 242 of the blade profile perpendicular to the chord 230.

The generation of the pitch movement α by means of the pitch mechanism which comprises a coupling device 31 and a bearing device 33 takes place as described in connection with FIG. 4. The blade bearing axis 33 rotates along the circular path 52 at a distance r from the axis of rotation 51 of the propulsion device. The repeated description of the movement of the coupling point 32 of the coupling device 31 at the blade 2 and of the coupling point 42 of the coupling device 31 at the offset device 4 during the rotation of the propulsion device in the direction of the arrow 53 is therefore spared. Everything that was said before in connection with the pitch mechanism is also true for the embodiment according to the second aspect of the invention illustrated in FIG. 8.

In FIG. 8 the blade bearing axis 33 is shifted toward the axis of rotation 51 by a distance w from a straight line (and/or from the corresponding plane 260, if the extension of the propulsion device in the third dimension is taken into account) which extends through the center of mass 250 of the blade and parallel to the chord 230 of the blade. It is to be understood that the relevant dimensions were here considered with respect to their projection on a plane perpendicular to the axis of rotation 51. When making the three-dimensional extension of the propulsion device a basis, there applies in accordance with the invention: The blade bearing axis 33 is shifted toward the axis of rotation 51 by a particular distance $w_{gx}$ relative to the plane 260 which extends through the center of mass 250 of the blade and parallel to both the axis of rotation 51 and the chord 230 of the blade 2. Moreover, the blade bearing axis 33 is shifted by the distance $w_{gz}$ relative to the plane which is perpendicular to the chord 230 and which extends through the center of mass 250. It turns out that the distance $w_{gz}$ substantially influences the mean value of the loads in the coupling device 31. As for the rest, $w_{gz}$ has a negligible influence on the loads at the offset device 4.

The shifting $w_{gx}$ of the blade bearing axis 33 away from the center of mass 250 enables to reduce the first harmonic vibration of the torque at the blade 2. This will be explained in detail soon. The reduction of the first harmonic vibration is associated with a reduction of the mean force at the offset device 4. This will be explained in detail in connection with FIG. 10.

In the following, the influence of the distance $w_{gx}$ on the load at the offset device 4 will be described. The blade 2 is mounted for pivoting about the blade bearing axis 33 and/or at the blade bearing point 33. During the rotation of the propulsion device about the axis of rotation 51 the blade 2 performs two rotational movements. The first rotational movement is the rotation of the blade 2 along the circular path 52, the second is the rotation of the blade 2 about the blade bearing axis 33 due to the pitch movement a. Each of these rotational movements effects a corresponding force and/or a corresponding torque on the blade 2. Due to the rotation of the blade 2 about the axis of rotation 51 of the propulsion device the centrifugal force $F_Z$ acts on the blade 2. This centrifugal force $F_Z$ engages in the center of mass 250 of the blade 2. If M designates the mass of the blade 2, r indicates the distance of the blade bearing point 33 from the axis of rotation 51 and ω indicates the angular speed of the propulsion device, then the amount of the centrifugal force $F_Z$ is given by $$F_Z = M \cdot r \cdot \omega^2.$$

The centrifugal force $F_Z$ in turn effects a torque $T_Z$ at the blade 2 which attempts to rotate the blade 2 about the blade bearing axis 33. This torque $T_Z$ is given by $$T_Z = F_Z \cdot \ell,$$

wherein $\ell$ is the distance of the center of mass 250 from the blade bearing axis 33; this means that $\ell$ is given as the perpendicular from the blade bearing axis 33 on the vector of the centrifugal force $F_Z$ engaging in the center of mass 250. The distance $\ell$ depends on the pitch angle α of the blade; in other words, the distance $\ell$ is a function of the pitch angle α; in even other words, the distance $\ell$ is a function of the pitch movement α. Therefore: $\ell = \ell(\alpha)$.

In addition to the torque $T_Z$ caused by the centrifugal force $F_Z$, another torque $T_I$ acts on the blade 2 due to the pitch movement α about the blade bearing axis 33. This torque $T_I$ depends, on the one hand, on the mass inertia moment I of the blade, relating to the blade bearing axis 33, and, on the other hand, on the angular acceleration of the pitch movement α. The torque $T_I$ is given as $$T_I = I \cdot \frac{d^2\alpha}{dt^2},$$

wherein the angular acceleration is given by the second time derivative of the pitch movement α.

The total torque T acting on the blade is thus given by $$T = T_Z + T_I = F_Z \cdot \ell(\alpha) + I \cdot \frac{d^2\alpha}{dt^2}.$$

A Taylor expansion of the total torque T in the pitch angle α and/or in the pitch movement α results in that, with realistic amplitudes $\alpha_A$ of the pitch movement α, such as for instance $\alpha_A = 50°$, i.e. $-50° < \alpha < +50°$, harmonic values of the pitch movement which are higher than the fundamental harmonic vibration can substantially be neglected with respect to the mean force on the eccentric bearing axis 41. Moreover, it results from the Taylor expansion in consideration of the geometry illustrated in FIG. 8 that the contribution to the total torque T on the blade 2 produced by the fundamental harmonic vibration is proportional to the following term R:

$$R = w_{gx} \cdot M \cdot r \left(1 - \frac{\alpha_A^2}{8}\right) - \left(I_{cm} + (w_{gx}^2 + w_{gz}^2) \cdot M\right).$$

$I_{cm}$ designates the mass inertia moment calculated with respect to the center of mass 250 of the blade which may be calculated by means of the Steiner theorem from the mass inertia moment I, related to the blade bearing axis 33. $w_{gz}$ indicates the distance of the center of mass 250 from a straight line which is perpendicular to the chord 230 and extends through the blade bearing point 33. It turns out that $w_{gz}$ substantially influences the mean value of the moment. Thus, $w_{gz}$ can be used to influence the mean values in the coupling device 31. This coupling device 31 is, due to geometry, regularly a very large structural element in which a compressive load may cause failure by kinking, which thus constitutes a critical loading condition. With the parameter $w_{gz}$ a bias can now be effected in the tension direction in the coupling device 31 by the shifting of the mean values, so that no compressive forces occur therein in operation. Thus, the critical loading condition of a compressive load need not be taken into consideration, and this structural element can be designed in a substantially simpler way. $w_{gz}$ has moreover no substantial influence on the load of the eccentric bearing axis 41. Due to the symmetrical distribution of a plurality of coupling devices 31 along the circular path 52 the mean values in the coupling devices 31 in the offset device 4 cancel out. In a particularly preferred manner $w_{gz}$ is chosen such that the blade bearing point lies between the center of mass 250 and the leading edge 210. $w_{gx}$ influences substantially the first harmonic value of the torque at the blade. For the determination of this first harmonic value $w_{gz}$ may be neglected. This is due to the fact that $w_{gz}$ is indeed contained in the formula for optimization (term R above), but that it has only a very small influence as compared to $w_{gx}$. This can be seen by the fact that $w_{gz}$ is only included by the square in the above formula for R.

If this term R is minimized, i.e. R=0, the torque T of the blade is also minimized. The influence exerted by the torque T on the blade is transferred via the coupling device 31 to the offset device 4. In connection with FIG. 10 it will be described that the first harmonic value of the torque T at the blade 2 results in a mean force at the offset device 4. This means that it is possible by the variation of the distance $w_{gx}$ to minimize the loads at the offset device 4 due to the centrifugal force $F_Z$ and the mass inertia of the blade 2.

FIG. 9 illustrates the progression of the two components 91, 92 of the mean force at the eccentric bearing axis in x and/or z direction (global coordinate system), both normalized to the force $F_x$ at $w_{gx}=0$. Thus, also the relation between the components may be read. The ordinate 93 indicates the function value, the abscissa 94 the distance $w_{gx}$ measured in centimeters.

In this parameter study the eccentric bearing axis is deflected in the positive x direction. Thus, a substantial mean force results at $w_{gx}=0$ in the x direction. This may now be reduced with the parameter $w_{gx}$. In the case of an ideal configuration this component may even vanish. Preferably $w_{gx}$ is chosen such that the component $F_x$ 91 becomes negative. Thus, a stabilization of the system results since the mean force at the eccentric bearing axis counteracts the deflection thereof. If the offset distance is now increased, the mean force also increases, which precisely counteracts this deflection. However, at $w_{gx}=0$ the component $F_x$ 91 acts in the direction of the deflection. If the deflection is increased, the mean force again also increases in the direction of the deflection, which corresponds to an instable property. If, for instance, during a failure of the control the eccentric bearing axis could move freely, the rotor would destroy itself at $w_{gx}=0$ since the mean force always acts in the positive deflection direction. If, however, the force is directed contrary to the deflection, this has a stabilizing effect. The reduction of the mean force at the offset device can be recognized clearly. Specifically, the progression of the graph $F_x$ reveals that a reduction of the mean force occurs at the offset device as soon as the blade bearing axis and/or the blade bearing point is positioned at a distance w from the center of mass of the blade. This means that an improvement as compared to the bearing of the blade in the center of mass always occurs in accordance with the invention when realistic conditions are made a basis.

The mean force at the offset device as a function of the distance w was calculated by using a further calculation of all forces and moments and an additional consideration of aerodynamic loads.

FIG. 9 reveals that the zero-crossing of $F_x$ 91 of the mean force at the offset device occurs at a distance $w_{gx}$ of approximately 3.4 mm. Taking into account the geometry underlying the model calculation, this corresponds very well to the value obtained by minimizing the term R derived in connection with FIG. 8.

The embodiments described in particular in connection with FIGS. 4-6 and concerning the first aspect of the invention allow the minimization of the contributions of the even higher harmonic values of the vibrations of the torque at the blade. Due to the overlapping when a plurality of blades are used, for instance with five blades, a minimization of the total vibration thus results at the offset device, as will be shown in detail in connection with FIG. 10. The embodiments described in connection with FIGS. 8 and 9 and concerning the second aspect of the invention allow the minimization of the fundamental vibration of the torque at the blade, and further due to the overlapping of a plurality of blades, of the mean force at the offset device and/or the eccentric bearing axis.

By combining the first and second aspects of the invention it is therefore possible to substantially reduce the loads at the offset device of the propulsion device. This means that, by an appropriate choice of the angle $w_\alpha$ and of the distance $w_{gx}$, a substantial reduction of the vibrations and of the mean force at the offset device and/or the eccentric bearing axis and of the related loads is achieved.

FIG. 10 shows a Table demonstrating the influence of harmonic values on the load at the offset device and/or the eccentric bearing axis as a function of the number of blades of the propulsion device. The parameter n 81 designates the number of blades. The parameter j 83 indicates the ordinal number of the harmonic values of the loads at the offset device resulting from individual blades, wherein the loads were calculated in a reference system co-rotating with the propulsion device. If one proceeds to a stationary reference system, a redistribution and an overlapping of the harmonic values j 83 of all blades will result therefrom. In the stationary reference system the parameter k 82 designates the ordinal number of the harmonic values of the loads at the offset device. The Table indicates for each harmonic value k 82 in the stationary reference system which harmonic values j 83 in the co-rotating reference system determine same.

For the stationary reference system the following can be derived from the Table of FIG. 10. Irrespective of the number of blades a fundamental harmonic value in the co-rotating reference system always results in a mean force at the offset device. This becomes clear by the entries in the column designated with 84. In other words, the fundamental harmonic values j=1 in the load of the blade in the co-rotating reference system effect a mean force, characterized by the contribution of zeroth order k=0, in the stationary reference system. Furthermore, propulsion devices with different numbers of blades react differently to harmonic values j 83 in the loads in the co-rotating reference system. This results already from the fact that in the stationary reference system different harmonic values k vanish; vanishing harmonic values are designated by empty fields 87.

The Table of FIG. 10 finally reveals that a propulsion device with n=5 blades is particularly advantageous. This is first of all due to the fact that for the case of n=5 the harmonic values of the loads with the ordinal number k=1, 2, 3, 4 vanish in the stationary reference system. The harmonic values 86 with the high ordinal numbers k=10 and k=15 are strongly suppressed. Pursuant to the Table of FIG. 10 the loads at the offset device therefore result in the case of n=5 blades substantially from the mean force k=0, 84, and the harmonic value of fifth order, k=5, 85. The Table further reveals that the mean force 84 in the stationary reference system is effected by the fundamental harmonic vibration, j=1, in the blade and/or in the coupling device in the co-rotating reference system. This mean force can, as described before in connection with FIGS. 8, 9, be minimized by a positioning of the distance w at a particular distance from the center of mass of the blade. The harmonic value of fifth order results pursuant to FIG. 10 from the harmonic values of the fourth, j=4, and sixth, j=6, orders of the vibrations in the co-rotating reference system. These are even higher harmonic values. As described in connection with the embodiments illustrated in FIGS. 3-7, these values may be minimized by a choice—in accordance with the invention—of the coupling point of the coupling device at the blade at a particular angle from the tangential plane through the blade bearing point.

This shows that the two aspects in accordance with the invention effect a particularly advantageous reduction of the loads at the offset device and/or at the eccentric bearing axis with a propulsion device comprising five blades.

LIST OF REFERENCE NUMBERS

1 propulsion device
100 aircraft/cyclogyro
11 disk of the propulsion device 1
2 blade
210 leading edge of the blade 2
220 trailing edge of the blade 2
230 chord of the blade 2
240 camber line of the blade 2
241 upper side of the blade 2
242 lower side of the blade 2
250 center of mass of the blade 2
260 plane passing through the center of mass 250 and extending parallel to the axis of rotation 51 and parallel to the chord 230
3 pitch mechanism
31 coupling device of the pitch mechanism 3/conrod
32 coupling point of the coupling device 31 to the blade 2
33 bearing device of the pitch mechanism 3/blade bearing axis/blade bearing point
300 circular arc of the pitch movement
4 offset device 41 eccentric bearing axis
42 coupling point of the coupling device 31 to the offset device 4
43 offset distance of the eccentric bearing axis 41 from the axis of rotation 51 of the propulsion device 1
51 axis of rotation of the propulsion device 1
52 circular path about the axis of rotation 51
53 arrow for indicating the direction of rotation of the propulsion device 1
54 tangential plane/tangent to the circular path 52 through the blade bearing axis 33
61 connection element for the indirect coupling of the coupling device 31 to the blade 2
62 connection element for the coupling of the coupling device 31 to the blade 2
7 graph of the normalized loads at the offset device 4 as a function of the angle $w_\alpha$
71 ordinate, designating the normalized loads at the offset device 4
72 abscissa, designating the angle $w_\alpha$ in degrees
81 number n of blades
82 ordinal number k of the harmonic values of the loads at the offset device indicated in a stationary reference system
83 ordinal number j of the harmonic values of the loads at the offset device indicated in a reference system co-rotating with the propulsion device
84, 85, 86 non-vanishing contributions to the load at the offset device
87 vanishing contributions
9 graph of the normalized mean force at the offset device 4 as a function of the distance $w_{gx}$ of the blade bearing axis 33 from the center of mass 250
91 x component of the mean force at the eccentric bearing axis 41
92 y component of the mean force at the eccentric bearing axis 41
93 ordinate, designating the normalized mean force at the offset device 4
94 abscissa, designating the distance $w_{gx}$ in millimeters
α pitch angle/pitch movement
$w_\alpha$ angle between the tangent 54 to the circular path and the connection line of the coupling point 32 to the blade bearing axis 33
$w_{gx}$ distance of the blade bearing axis 33 from the plane 260 through the center of mass 250 and parallel to the chord 230
$w_{gz}$ distance of the blade bearing axis 33 from the plane through the center of mass 250 and perpendicular to the chord 230
r distance of the blade bearing axis 33 from the axis of rotation 51 of the propulsion device 1
ℓ distance of the center of mass 250 from the blade bearing point 33
ρ angle between blade bearing axis 33, coupling point 32 and axis of rotation 51
$F_Z$ centrifugal force acting on the blade

The invention claimed is:

1. A propulsion device (1) for an aircraft (100), comprising
a blade (2) which can be rotated about an axis of rotation (51) of the propulsion device (1) along a circular path (52);
a pitch mechanism (3) having a coupling device (31) and a bearing device (33),
wherein the blade (2) is mounted for pivoting about a blade bearing axis (33) parallel to the axis of rotation (51) of the propulsion device; and
an offset device (4) to which the blade is coupled by the coupling device (31) at a connection point (42), wherein the offset device (4) defines an eccentric bearing axis (41) which is mounted at an adjustable offset distance (43) parallel to the axis of rotation (51) of the propulsion device,
such that the rotation of the blade (2) along the circular path (52) about the axis of rotation (51) of the propulsion device effects a pitch movement (a) of the blade (2) when the offset distance (43) is set to a nonzero value; and
wherein the coupling device (31) is coupled to the blade (2) at a coupling point (32), wherein the coupling point (32) is positioned in such a way that the plane that comprises the blade bearing axis (33) and the coupling point (32) and the tangential plane (54) to the circular path (52) through the blade bearing axis (33) include a certain, non-vanishing angle ($w_\alpha$) when the offset distance (43) is set to zero,
wherein the certain, non-vanishing angle ($w_\alpha$) assumes a value in the range of 75% to 125% of the ratio of the distance of blade bearing axis (33) to coupling point (32) to the distance (r) of axis of rotation (51) to blade bearing axis (33) when the offset distance (43) is set to zero.

2. The propulsion device (1) according to claim 1, wherein the certain, non-vanishing angle ($w_\alpha$) is set in such a way that the plane that comprises the blade bearing axis (33) and the coupling point (32) and the plane that comprises the axis of rotation (51) of the propulsion device and the connection line from the coupling point (32) to the axis of rotation (51) include an angle of almost 90° when the offset distance (43) is set to zero.

3. The propulsion device (1) according to claim 1, wherein the certain, non-vanishing angle ($w_\alpha$) assumes a value in the range of 90% to 110% of the ratio of the distance of blade bearing axis (33) to coupling point (32) to the distance (r) of axis of rotation (51) to blade bearing axis (33) when the offset distance (43) is set to zero.

4. The propulsion device (1) according to claim 1, wherein the coupling point (32) of the coupling device (31) at the blade is positioned outside of the blade profile.

5. The propulsion device (1) according to claim 1, wherein the blade bearing axis (32) is shifted toward the axis of rotation (51) of the propulsion device by a certain distance ($w_{gx}$) relative to the plane that extends through the center of mass (250) of the blade and that extends parallel to both the axis of rotation (51) and the chord (230) of the blade.

6. The propulsion device (1) according to claim 5, wherein the blade bearing axis (33) extends outside of the blade profile.

7. The propulsion device (1) according to claim 1, further comprising a connection element (61), wherein the connection element (61), at the point at which the blade (2) is mounted for pivoting by the bearing device (33), is connected rigidly with the blade (2), and at the coupling point (32) of the blade is connected movably with the coupling device (31).

8. The propulsion device (1) according to claim 1, wherein the coupling device (31) comprises a conrod which connects the connection point (42) of the offset device with the coupling point (32) of the blade.

9. The propulsion device (1) according to claim 1, comprising further blades (2) with a respectively associated pitch mechanism (3), wherein all blades (2) and pitch mechanisms (3) of the blade are of similar type, and wherein the blades (2) of the propulsion device are evenly distributed about the axis of rotation (51) of the propulsion device along the circular path (52).

10. The propulsion device (1) according to claim 1, wherein the propulsion device is a cyclogyro rotor.

11. A propulsion device (1) for an aircraft (100), comprising
a blade (2) which can be rotated about an axis of rotation (51) of the propulsion device along a circular path (52);
a pitch mechanism (3) having a coupling device (31) and a bearing device (33),
wherein the blade (2) is mounted by the bearing device (33) for pivoting about a blade bearing axis (33) parallel to the axis of rotation (51) of the propulsion device;
an offset device (4) to which the blade is coupled by the coupling device (31) at a connection point (42), wherein the offset device (4) defines an eccentric bearing axis (41) which is mounted at an adjustable offset distance (43) parallel to the axis of rotation (51) of the propulsion device,
such that the coupling device (51) couples the blade (2) to the offset device (4) in such a way that the rotation of the blade (2) about the axis of rotation (51) of the propulsion device along the circular path (52) effects a pitch movement (a) of the blade (2) when the offset distance (43) is set to a nonzero value; and
wherein the blade bearing axis (33) is shifted toward the axis of rotation (51) of the propulsion device by a certain distance ($w_{gx}$) relative to the plane that extends through the center of mass (250) of the blade and that extends parallel to both the axis of rotation (51) and the chord (230) of the blade.

12. The propulsion device (1) according to claim 11, wherein the blade (2) has a mass distribution which is so inhomogeneous that it causes the shifting by the certain distance ($w_{gx}$).

13. The propulsion device (1) according to claim 11, wherein the blade bearing axis (33) is positioned in a region which is confined by the plane being perpendicular to the chord (230) and extending through the center of mass (250), on the one hand, and by the plane being perpendicular to the chord (230) and extending through the leading edge (210), on the other hand.

14. The propulsion device (1) according to claim 11, wherein the blade bearing axis (33) extends outside of the blade profile.

15. The propulsion device (1) according to claim 11, wherein the coupling device (31) comprises a conrod which connects the connection point (42) of the offset device with the coupling point (32) of the blade.

16. The propulsion device (1) according to claim 11, comprising further blades (2) with a respectively associated pitch mechanism (3), wherein all blades (2) and pitch mechanisms (3) of the blade are of similar type, and wherein the blades (2) of the propulsion device are evenly distributed about the axis of rotation (51) of the propulsion device along the circular path (52).

17. The propulsion device (1) according to claim 16, which comprises a total of five blades (2).

18. The propulsion device (1) according to claim 11, wherein the propulsion device is a cyclogyro rotor.

* * * * *